(12) United States Patent
Du

(10) Patent No.: US 12,530,846 B2
(45) Date of Patent: Jan. 20, 2026

(54) BATCH RENDERING METHOD AND APPARATUS, DEVICE, AND STORAGE MEDIUM

(71) Applicant: Beijing Zitiao Network Technology Co., Ltd., Beijing (CN)

(72) Inventor: Jing Du, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/022,454

(22) PCT Filed: Oct. 27, 2022

(86) PCT No.: PCT/CN2022/127856
§ 371 (c)(1),
(2) Date: Feb. 21, 2023

(87) PCT Pub. No.: WO2023/202023
PCT Pub. Date: Oct. 26, 2023

(65) Prior Publication Data
US 2024/0265634 A1 Aug. 8, 2024

(30) Foreign Application Priority Data

Apr. 22, 2022 (CN) .......................... 202210431401.7

(51) Int. Cl.
*G06T 17/20* (2006.01)
*G06T 13/40* (2011.01)
(Continued)

(52) U.S. Cl.
CPC ............. *G06T 17/20* (2013.01); *G06T 13/40* (2013.01); *G06T 15/005* (2013.01); *G06T 15/205* (2013.01); *G06V 10/54* (2022.01)

(58) Field of Classification Search
None
See application file for complete search history.

(56) References Cited

U.S. PATENT DOCUMENTS

| | | | |
|---|---|---|---|
| 2013/0076747 A1* | 3/2013 | Koenig | ................ A61B 6/5223 345/419 |
| 2022/0005261 A1* | 1/2022 | Sjulsen | ................... G06T 17/00 |
| 2022/0319095 A1 | 10/2022 | Tang et al. | |

FOREIGN PATENT DOCUMENTS

| | | |
|---|---|---|
| CN | 109840931 A | 6/2019 |
| CN | 111063032 A | 4/2020 |

(Continued)

OTHER PUBLICATIONS

English Translation of CN 113426130 (Year: 2021).*
(Continued)

*Primary Examiner* — Michael J Cobb
(74) *Attorney, Agent, or Firm* — Astute IP Law Group

(57) ABSTRACT

A batch rendering method includes: acquiring a model list corresponding to a to-be-rendered role, wherein the model list includes at least one to-be-rendered three-dimensional model; searching the at least one to-be-rendered three-dimensional model according to a preset batch rendering condition to determine to-be-merged models, where each of the to-be-merged models is a to-be-rendered three-dimensional model satisfying the preset batch rendering condition; performing model data merging in set different merging properties according to model data sets corresponding to the searched to-be-merged models to obtain merged data in each of the merging properties; and acquiring the merged data in each of the merging properties based on a generated batch rendering instruction to perform a rendering presentation of images corresponding to the searched to-be-merged models.

3 Claims, 9 Drawing Sheets

(51) Int. Cl.
*G06T 15/00* (2011.01)
*G06T 15/20* (2011.01)
*G06V 10/54* (2022.01)

(56) References Cited

FOREIGN PATENT DOCUMENTS

| CN | 112669418 A | 4/2021 |
|---|---|---|
| CN | 113076152 A | 7/2021 |
| CN | 113426130 A | 9/2021 |
| WO | 2015196414 A1 | 12/2015 |

OTHER PUBLICATIONS

Vocabulary.com, "Role", 2024, retrieved from "www.vocabulary.com/dictionary/role" (Year: 2024).*
Britannica Online, "Role", 2020, Encyclopedia Britannica, retrieved from www.britannica.com/print/article/507038 (Year: 2020).*
International Search Report for International Patent Application No. PCT/CN2022/127856, mailed Jan. 18, 2023 (9 pages).
European Search Report in European Application No. 22851002.0, mailed Feb. 27, 2024, 5 pages.
Marek, Krzeminski, "Is it possible to do Batch Rendering with 3D skeletal animation data?—Graphics and GPU Programming—GameDev.net", Nov. 23, 2014, 5 pages.
Nvidia, "Improving Batching Using Texture Atlases", SDK White Paper wp-01387-001-V01, Jul. 1, 2004, 17 pages.

* cited by examiner

| Merged material attribute | Material instance 1 | Texture merging information | Texture 1 | Texture array layer |
| | | | | Texture UV offset |
| | | | | Texture UV scaling |
| | | | Texture 2 | Texture array layer |
| | | | | Texture UV offset |
| | | | | Texture UV scaling |
| | | ... | | |
| | | Material attribute | Material attribute 1 | ... |
| | | | Material attribute 2 | |
| | | | Material attribute 3 | |
| | | | ... | |
| | Material instance 2 | Texture merging information | Texture 1 | Texture array layer |
| | | | | Texture UV offset |
| | | | | Texture UV scaling |
| | | | Texture 2 | Texture array layer |
| | | | | Texture UV offset |
| | | | | Texture UV scaling |
| | | ... | | |
| | | Material attribute | Material attribute 1 | ... |
| | | | Material attribute 2 | |
| | | | Material attribute 3 | |
| | | | ... | |

FIG. 10

BATCH RENDERING METHOD AND APPARATUS, DEVICE, AND STORAGE MEDIUM

CROSS-REFERENCE TO RELATED APPLICATION(S)

This is a national stage application filed under 37 U.S.C. 371 based on International Patent Application No. PCT/CN2022/127856, filed Oct. 27, 2022, which claims priority to Chinese Patent Application No. 202210431401.7 filed with the China National Intellectual Property Administration (CNIPA) on Apr. 22, 2022, the disclosure of which is incorporated herein by reference in its entirety.

TECHNICAL FIELD

The present disclosure relates to the technical field of image processing, for example, a batch rendering method and apparatus, a device, and a storage medium.

BACKGROUND

With the development of electronic entertainment industry, three-dimensional games and animations are favored by more and more users. The presentation of a three-dimensional game or animation on a screen is mainly implemented through the graphics rendering of the corresponding three-dimensional models. The better a rendering effect, the higher the image quality of the game or animation.

In an implementation of graphic rendering, a drawing instruction (Draw Call) is a rendering instruction submitted by a central processing unit (CPU) to a graphics processing unit (GPU), which is also referred to as a rendering batch.

When rendering is performed on a character object such as a person or an animal in a three-dimensional scene, since the rendering of the character object relates to model data such as bone animation and deformation, more rendering batches need to be submitted if conventional rendering is directly performed on the character object. Therefore, the problems of a very high occupancy rate of the CPU, a longer frame length, worse rendering performance, and a reduced frame rate of graphics rendering exist in the whole rendering process, affecting user experience.

SUMMARY

The present disclosure provides a batch rendering method and apparatus, a device, and a storage medium, so as to implement effective rendering on a character object in a three-dimensional scene.

In a first aspect, the present disclosure provides a batch rendering method. The method includes the steps described below.

A model list corresponding to a to-be-rendered character is acquired, where the model list includes at least one to-be-rendered three-dimensional model.

The at least one to-be-rendered three-dimensional model according to a preset batch rendering condition is searched to determine to-be-merged models, where each of the to-be-merged models is a to-be-rendered three-dimensional model satisfying the preset batch rendering condition.

Model data merging is performed in set different merging properties according to model data sets corresponding to the determined to-be-merged models so that merged data in each of the merging properties are obtained.

The merged data in each of the merging properties are acquired based on a generated batch rendering instruction so that a rendering presentation of images corresponding to the determined to-be-merged models is performed.

In a second aspect, the present disclosure further provides a batch rendering apparatus. The apparatus includes an acquisition module, a determination module, a merging module, and a rendering module.

The acquisition module is configured to acquire a model list corresponding to a to-be-rendered character, where the model list includes at least one to-be-rendered three-dimensional model.

The determination module is configured to search the at least one to-be-rendered three-dimensional model according to a preset batch rendering condition to determine to-be-merged models, where each of the to-be-merged models is a to-be-rendered three-dimensional model satisfying the preset batch rendering condition.

The merging module is configured to perform model data merging in set different merging properties according to model data sets corresponding to the determined to-be-merged models to obtain merged data in each of the merging properties.

The rendering module is configured to acquire the merged data in each of the merging properties based on a generated batch rendering instruction to perform a rendering presentation of images corresponding to the determined to-be-merged models.

In a third aspect, the present disclosure further provides an electronic device. The electronic device includes one or more processors and a storage apparatus.

The storage apparatus is configured to store one or more programs.

The one or more programs, when executed by the one or more processors, cause the one or more processors to perform the batch rendering method provided in the first aspect of the present disclosure.

In a fourth aspect, the present disclosure further provides a storage medium including computer-executable instructions which, when executed by a computer processor, cause the computer processor to perform the batch rendering method provided in the first aspect of the present disclosure.

BRIEF DESCRIPTION OF DRAWINGS

FIG. 10 is a diagram showing a merging result of material attribute data of to-be-merged models in an example implementation of a batch rendering method according to an embodiment of the present disclosure;

DETAILED DESCRIPTION

Figure 1:
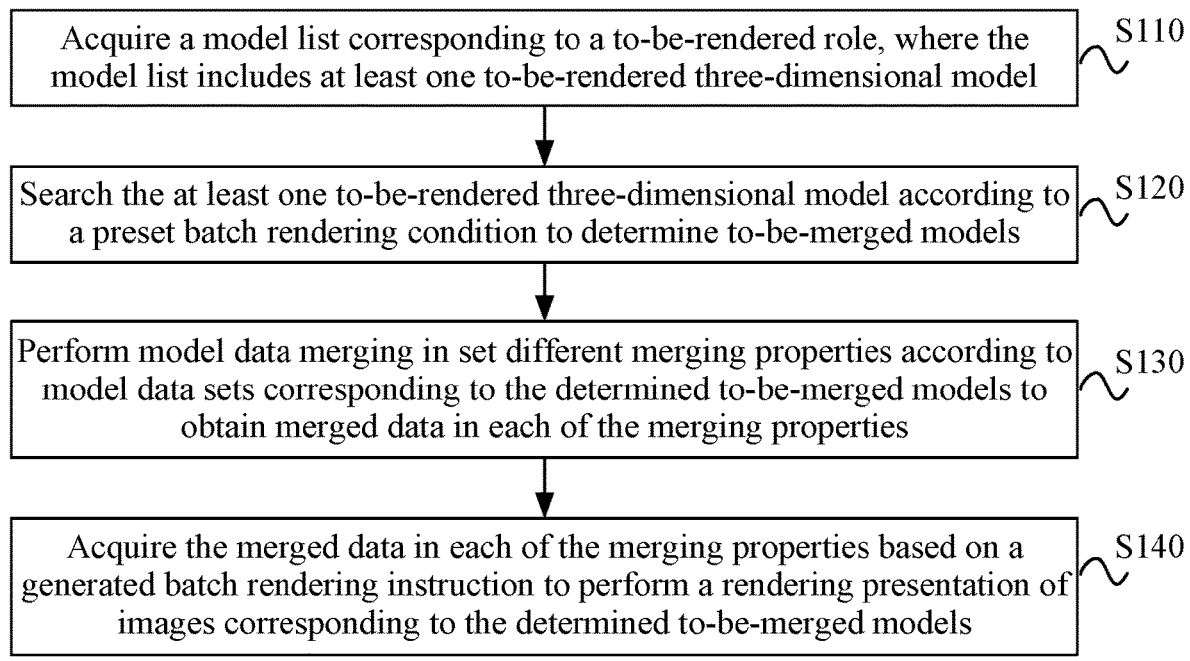
FIG. 1 is a flowchart of a batch rendering method according to an embodiment of the present disclosure.

Embodiments of the present disclosure are described hereinafter with reference to drawings. Although some embodiments of the present disclosure are shown in the drawings, the present disclosure may be implemented in multiple forms. These embodiments are provided for understanding the present disclosure.

The drawings and the embodiments of the present disclosure are illustrative only.

Multiple steps recited in a method embodiment of the present disclosure may be performed in a different order and/or performed in parallel. Additionally, the method embodiment may include additional steps and/or omit the execution of illustrated steps. The scope of the present disclosure is not limited in this respect.

As used herein, the term "include" and variations thereof refer to "including, but not limited to". The term "based on" refers to "at least partially based on". The term "an embodiment" refers to "at least one embodiment"; the term "another embodiment" refers to "at least one other embodiment"; and the term "some embodiments" refers to "at least some embodiments". Related definitions of other terms are given hereinafter.

Concepts such as "first" and "second" in the present disclosure are intended to distinguish between different apparatuses, modules, or units and not to limit a sequence of or interdependence between functions implemented by these apparatuses, modules, or units.

"One" or "multiple" in the present disclosure is illustrative and non-restrictive and those skilled in the art should understand that "one" or "multiple" is interpreted as "one or more" unless otherwise specified in the context.

Names of messages or information exchanged between multiple apparatuses in embodiments of the present disclosure are used for an illustrative purpose and are not to limit the scope of such messages or information.

Data (including, but not limited to, the data itself and the acquisition or use of the data) involved in the technical solutions should comply with the requirements of corresponding laws and regulations and relevant provisions.

FIG. 1 is a flowchart of a batch rendering method according to an embodiment of the present disclosure. The embodiment of the present disclosure is applicable to the case where rendering is performed on a character object in a three-dimensional scene. The method may be performed by a batch rendering apparatus which may be implemented by software and/or hardware. For example, the apparatus may be implemented by an electronic device which may be a mobile terminal, a personal computer (PC) terminal, a server, or the like and may be implemented by a central processing unit in the electronic device.

Rendering methods are mainly applicable to general-purpose commercial rendering engines and batch rendering during the batch rendering mainly includes static rendering, dynamic rendering, and instantiated rendering. The static rendering is described as follows: models of static objects in a to-be-rendered scene are merged at a making stage. The merging operation can only merge vertices and index buffers of the models, which cannot reduce rendering batches and just reduces the switching of index buffers between rendering batches. The dynamic rendering may be described as follows: models with the same material attributes and relatively small amounts of vertex data in a to-be-rendered scene are merged. This rendering manner can reduce rendering batches and the switching of index buffers. The instantiated rendering may be described as follows: a GPU performs repeated rendering on different drawing instances in the same rendering batch, where the different drawing instances are characterized by using the same models and material data and only added with a small amount of different instantiated data.

When the preceding types of batch rendering are implemented, rendering batches that can be merged are required to have the same rendering state, which is equivalent to that models for batch rendering are required to have the same material attributes. Meanwhile, the batch rendering methods are mostly applicable to general rendering scenes and do not support the merging of bone animation data and deformation data in models. Since bone animation and deformation of different models use different bone matrices and deformation vertex data, even if the models have the same material attributes, batch rendering cannot be performed on the models in which the bone animation and the deformation are used.

However, in a rendering scene where a character object such as a three-dimensional person or animal needs to be presented, if the character object desires to be rendered with high efficiency, batch rendering needs to be performed. However, effective rendering on the character object cannot be implemented based on the batch rendering methods. Effective batch rendering on the character object such as the three-dimensional person or animal can be implemented based on the batch rendering method provided in the embodiment.

As shown in FIG. 1, the batch rendering method provided in the embodiment of the present disclosure includes the steps described below.

In S110, a model list corresponding to a to-be-rendered character is acquired, where the model list includes at least one to-be-rendered three-dimensional model.

In the embodiment, the to-be-rendered character may be considered as a to-be-rendered character object in a character object rendering scene. In the character object scene, one to-be-rendered image may include multiple to-be-rendered characters. In this step, a model list may be acquired separately for each to-be-rendered character. Each to-be-rendered character tends to be represented by a series of three-dimensional models.

For example, a person character includes clothes, a body, hair, a head, a nose, eyes, ears, a mouth, and other parts. When three-dimensional models of the person character are designed, it is necessary to separate multiple parts, design a three-dimensional model separately for each part, and form a customized person character by splicing different three-dimensional models and setting model data of each three-dimensional model. When the model data are different, the formed person character is different.

In the embodiment, one person character may be composed of multiple three-dimensional models. In the embodiment, three-dimensional models that constitute a person are denoted as to-be-rendered models, and multiple to-be-rendered models may be summarized into one model list. In this step, after the to-be-rendered character is determined, the model list corresponding to the to-be-rendered character may be acquired. The batch rendering scheme provided in the embodiment may consider each to-be-rendered character as one batch rendering object and mainly considers merging to-be-rendered models in a model list corresponding to one batch rendering object.

In S120, the at least one to-be-rendered three-dimensional model are searched according to a preset batch rendering condition to determine to-be-merged models, where each of the to-be-merged models is a to-be-rendered three-dimensional model satisfying the preset batch rendering condition.

In the embodiment, when batch rendering is performed on to-be-rendered models of one to-be-rendered character, the batch rendering may not be performed on all the to-be-rendered models. To-be-rendered models that can be merged need to be adjusted for the batch rendering. The batch rendering condition may be a condition for selecting the to-be-rendered models that can be merged. In this step, to-be-rendered models that satisfy the batch rendering condition may be used as the to-be-merged models. In the embodiment, the batch rendering condition may be set based on an execution state of a GPU when the to-be-rendered models are rendered. That is, only to-be-rendered models that are rendered by the GPU with the same execution state can be merged. In the embodiment, the execution state of the GPU may be considered from the aspects of a shader for rendering, a front/back culling mode for rendering, a depth template testing state for rendering, a mixing state for rendering, and the like.

In S130, model data merging is performed in set different merging properties according to model data sets corresponding to the determined to-be-merged models so that merged data in each of the merging properties are obtained.

In the embodiment, after multiple to-be-merged models corresponding to the to-be-rendered character are determined in the preceding steps, the merging of the multiple to-be-merged models may be considered. In an implementation, the merging of the multiple to-be-merged models is equivalent to the merging of data in the model data sets corresponding to the multiple to-be-merged models. The data merging of the to-be-merged models may be performed in different merging properties in this step.

For a three-dimensional model of a character, data in a model data set corresponding to the three-dimensional model includes at least vertex-related data of triangular facets on which the rendering of the three-dimensional model depends and may also include some bone-related data and some deformation-related data for facial expression changes. In the embodiment, the preceding vertex-related data, bone-related data, and deformation-related data may be considered as basic data in the model data set, where the representation of the three-dimensional model depends on the basic data. The basic data are denoted as model mesh data in the embodiment.

Meanwhile, the model data set of the three-dimensional model also includes texture data required for rendering and basic material attribute data different from those of another three-dimensional model. The model mesh data, a texture, and a basic material attribute may be considered as model data corresponding to the three-dimensional model in different properties.

In the embodiment, the merging properties may be set according to properties of different data included in the model data set. For example, a model mesh property to which the model mesh data belong may be used as one merging property; a texture property to which the texture belongs may also be used as one merging property; and a material attribute property to which the basic material attribute belongs may also be used as one merging property. In this step, model mesh data, textures, and basic material attributes of the to-be-merged models may be merged in the model mesh property, the texture property, and the material attribute property, respectively, thereby obtaining the merged data in the corresponding property.

When the model mesh data of the multiple to-be-merged models are merged, vertex-related data, bone-related data, and deformation-related data of the multiple to-be-merged models may be merged separately in one buffer region and used as the whole merged mesh data. When the vertex-related data and the bone-related data are merged, updating information about vertex indexes and bone indexes of the multiple to-be-merged models needs to be considered. When the deformation-related data are merged, optimizing invalid deformation data and offset-free deformation data need to be considered.

The texture merging on the multiple to-be-merged models is equivalent to the merging of the textures used by the multiple to-be-merged models so that a merged texture with a large dimension is formed. Considering limitations to hardware devices of an execution body, a limitation exists for setting the dimension of the merged texture. To avoid problems caused by a limited texture dimension, the construction of a texture array may be considered in the embodiment, where the texture array is used for placing texture data of the multiple to-be-merged models.

The material attribute merging on the multiple to-be-merged models is equivalent to the merging of the material attributes of the multiple to-be-merged models. In the embodiment, material attribute data of each of the multiple to-be-merged models may be considered as one material embodiment and multiple material embodiments are arranged in order so that merged material attribute data of the multiple to-be-merged models are formed.

In the embodiment, merged data obtained in different merging properties may be used as model data sets required for rendering the multiple to-be-merged models, and the merged data obtained in the different merging properties are recorded in respective device disks. After the batch rendering is triggered, the merged data obtained in the different merging properties are acquired so that the multiple to-be-merged models related to the to-be-rendered character are rendered.

In S140, the merged data in each of the merging properties are acquired based on a generated batch rendering instruction so that a rendering presentation of images corresponding to the determined to-be-merged models is performed.

After the data merging is performed on the to-be-merged models in the preceding steps, the multiple to-be-merged models may be considered as one merged rendering batch and the merged data in each of the merging properties are acquired through the generated rendering instruction, thereby implementing the rendering presentation of the images corresponding to the multiple to-be-merged models. As one implementation of this step executed, the generated batch rendering instruction may be sent to an image processor, and after receiving the batch rendering instruction, the image processor may acquire the merged data in each of the merging properties. For example, the merged mesh data may be acquired so that related mesh data of the multiple to-be-merged models are acquired. The merged texture data may also be acquire so that the textures of the multiple to-be-merged models are acquired. Merged material attributes may also be acquired so that the material attributes of the multiple to-be-merged models are acquired. Finally, the rendering presentation of the images corresponding to the multiple to-be-merged models is implemented based on the acquired merged data in each of the merging properties.

According to the batch rendering method provided in the embodiment of the present disclosure, the batch rendering on the to-be-rendered character is proposed. The to-be-rendered models corresponding to the to-be-rendered character in the three-dimensional scene may be used as to-be-merged individuals, the multiple to-be-merged models on which the batch rendering is performed are selected from multiple to-be-rendered models, and the model data sets associated with the multiple to-be-merged models are merged in the different merging properties, so that the batch rendering is performed on the multiple to-be-rendered models of the to-be-rendered character. Additionally, in an implementation of the batch rendering, merging different types of model data is considered in different merging properties in the technical solution, thereby avoiding the problem of a failure to directly merge different model data and implementing effective batch rendering on the character such as the person and the animal in the three-dimensional scene.

Figure 2:
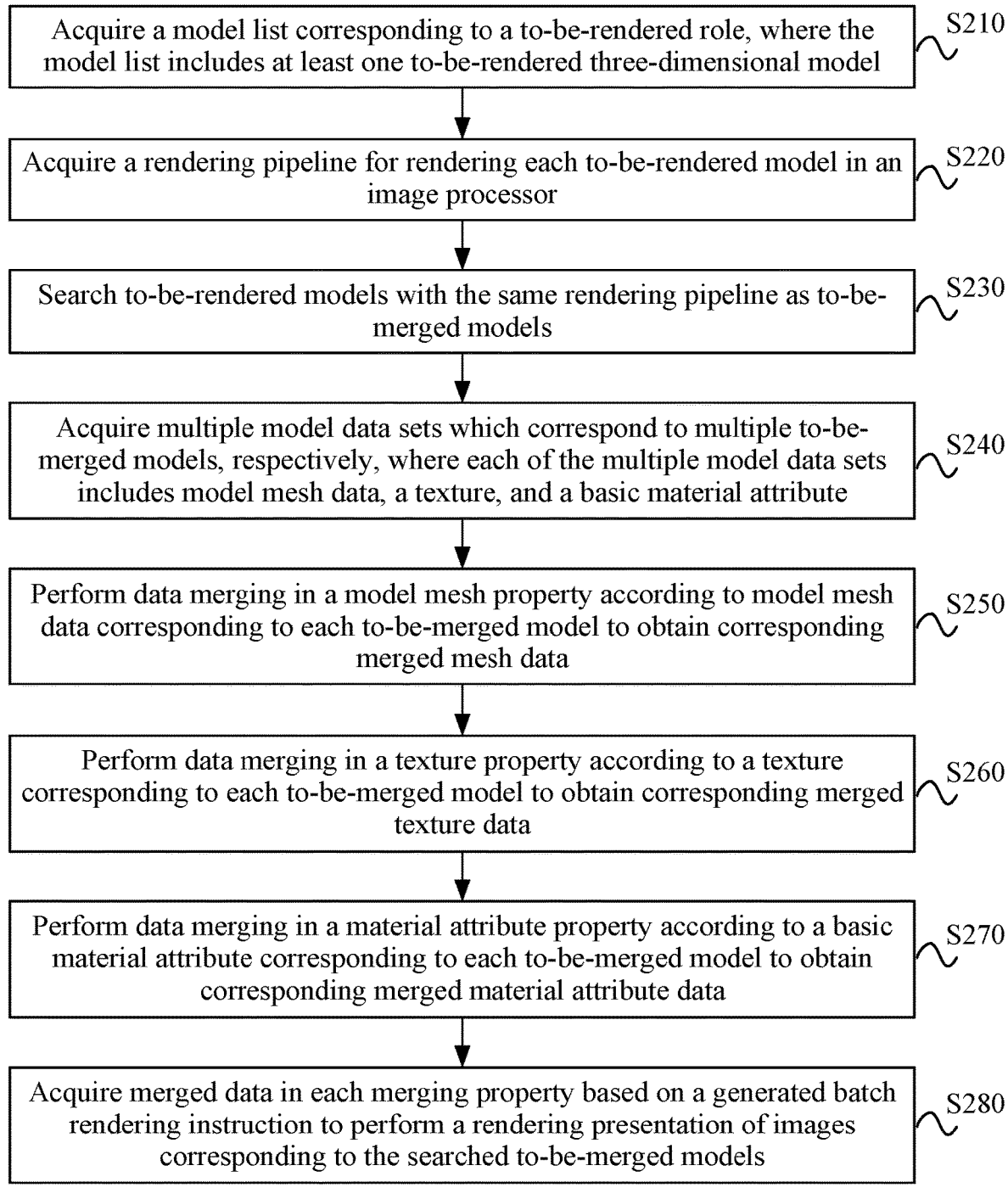
FIG. 2 is a flowchart of another batch rendering method according to an embodiment of the present disclosure.

FIG. 2 is a flowchart of another batch rendering method according to an embodiment of the present disclosure. As an embodiment of embodiments of the present disclosure, based on the preceding embodiment, the step in which the to-be-merged models are determined from the at least one to-be-rendered three-dimensional model according to the preset batch rendering condition is described in the embodiment. Meanwhile, the step in which the model data merging is performed in the set different merging properties according to the model data sets corresponding to the determined to-be-merged models so that the merged data in each of the merging properties are obtained is further described in the embodiment.

As shown in FIG. 2, the batch rendering method provided in the embodiment of the present disclosure includes the steps described below.

In S210, a model list corresponding to a to-be-rendered character is acquired, where the model list includes at least one to-be-rendered three-dimensional model.

For example, in an implementation of a rendering application, when a character such as a person or an animal is to be rendered and presented in a rendering scene, the character to be presented in the rendering scene may be denoted as the to-be-rendered character.

In the embodiment, it may be considered that to-be-rendered models in the model list corresponding to the to-be-rendered character are formed at a character-making stage, different to-be-rendered characters may have different to-be-rendered models, and to-be-rendered characters having the same to-be-rendered models may be presented in different states according to different model data of the same to-be-rendered models. The to-be-rendered character may have at least one to-be-rendered model and the at least one to-be-rendered model corresponding to the to-be-rendered character may constitute the model list corresponding to the to-be-rendered character.

In S220, a rendering pipeline for rendering each to-be-rendered model in an image processor is acquired.

When the to-be-rendered model begins to be rendered, some rendering tools are required, and the required rendering tools may be denoted as a rendering pipeline. The rendering pipeline includes parameter information such as a shader and some modes or states (for example, a front/back culling mode, a depth template testing state, and a mixing state). Generally, at a model making stage, the rendering pipeline used by a built model in a rendering process also needs to be configured. For example, the shader is configured, the front/back culling mode is configured, the depth template testing state is configured, and the mixing state is configured. Configuration information of the rendering pipeline corresponding to each model may be pre-stored and acquired from a disk space when necessary.

In the embodiment, a batch rendering condition may be set from the perspective of the rendering pipeline used by each to-be-rendered model. The batch rendering condition may be set based on configuration information of the rendering pipeline associated with each to-be-rendered model. Therefore, information about the rendering pipeline of each to-be-rendered model may be acquired in this step.

In S230, to-be-rendered models with the same rendering pipeline are searched as to-be-merged models.

In the embodiment, the rendering pipeline may include one or more of the shader, the front/back culling mode, the depth template testing state, or the mixing state. In the embodiment, the set batch rendering condition is that rendering pipelines corresponding to different models need to include the same shader, the same front/back culling mode, the same depth template testing state, and the same mixing state.

In the embodiment, the searching according to the batch rendering condition may be optimized to be determining whether the rendering pipelines used by different to-be-rendered models are the same. The searching may be determining whether the configuration information corresponding to the rendering pipelines associated with the different to-be-rendered models is the same. For example, whether used shaders are the same is determined, whether front/back culling modes are the same is determined, whether depth template testing states are the same is determined, and whether mixing states are the same is determined.

In this step, when it is determined that the configuration information of the rendering pipelines associated with the different to-be-rendered models is the same, it may be considered that these to-be-rendered models satisfy the batch rendering condition. Therefore, the to-be-rendered models with the same rendering pipeline can be searched and denoted as the to-be-merged models separately.

In the embodiment, during the searching, the to-be-rendered models using the same shader and having the same front/back culling mode, the same depth template testing state, and the same mixing state are searched as the to-be-merged models. The searching in this step can better avoid the case where data merging on the to-be-merged models cannot be implemented or types of the to-be-merged models do not match in a model data merging process and can better reflect the validity of the different to-be-rendered models participating in model data merging.

Batch rendering on multiple models in one rendering batch is equivalent to the image processor receiving a rendering instruction once. In this manner, multiple models can be rendered. The models are rendered mainly depending on data information of the models. When the batch rendering is performed, model data are acquired once so that data information of multiple to-be-merged models can be obtained. That is, to perform the batch rendering, it needs to be ensured that the data information of the multiple models participating in the batch rendering can be merged into one piece of data information. Therefore, the key to the batch rendering on models is equivalent to the effective merging of the data information corresponding to the multiple to-be-merged models.

Generally, in an implementation of the batch rendering on models, to ensure the effective merging of model data, it often needs to be limited that materials that can be merged have the same material information and data that can be merged have the same structure. However, when the batch rendering is performed under the preceding limitations, since to-be-rendered objects, which are characters such as the person and the animal in the three-dimensional scene, relate to model data such as bone animation and deformation and model data of models associated with different characters are difficult to be identical, the batch rendering under the limitations on materials and data structures cannot implement effective batch rendering on the character such as the person or the animal in the three-dimensional scene.

According to the batch rendering method provided in the embodiment, from the perspective of different merging properties, the data information corresponding to the multiple to-be-merged models can be effectively merged in the different merging properties through S240 to S270 described below.

In S240, multiple model data sets corresponding to the multiple to-be-merged models are acquired, where each of the model data sets includes model mesh data, a texture, and a basic material attribute.

In the embodiment, the model data set of each to-be-merged model is also formed at the model making stage, and the formed model data set is stored. In this step, the model data set corresponding to each to-be-merged model can be obtained.

In the embodiment, a model data set of a model may be a set including all data information required for rendering the model. According to different functions of different data in the model data set in a rendering implementation, the data in the model data set may be divided in different function properties. Therefore, the model data set includes the model mesh data required for model mesh rendering and also includes texture data required for model texture rendering and material attribute data required for model material rendering. Considering that the texture data are one type of material attribute, material attribute data with the texture data removed are denoted as basic material attributes.

For example, for one model, the corresponding model mesh data may include vertex-related data (for example, vertex attribute data and vertex index offsets), skinned mesh data for representing bone animation, and fusion morphology data for representing expression changes of the character. A model tends to be rendered in units of triangular facets. In other words, the rendering on the model is converted to the rendering on multiple triangular facets. Each triangular facet may be represented by three vertices. Therefore, the vertex-related data may be considered as basic data for model rendering.

In the embodiment, the vertex-related data included in the model mesh data may include data such as vertex coordinates, normals, tangents, shades, and vertex indexes; the skinned mesh data may include data such as bone weights, bone indexes, binding postures, and a bone matrix; and the fusion morphology data may include data such as vertex increments, normal increments, and tangent increments. Texture data are image data required for model mapping and also equivalent to one material attribute of the model. Generally, one model may correspond to multiple textures. Basic material attribute data may include data such as color attributes and brightness attributes for a rendering presentation.

In S250, data merging is performed in a model mesh property according to model mesh data corresponding to each to-be-merged model so that corresponding merged mesh data are obtained.

In the embodiment, different types of data divided in the model data set may be considered as different merging properties separately. This step is equivalent to the data merging on the multiple to-be-merged models in the model mesh property. This step is mainly an implementation in which model mesh data of the multiple to-be-merged models are merged.

For example, the process of merging the model mesh data of the multiple to-be-merged models may be described below. (1) Data of the same type among the model mesh data corresponding to the to-be-merged models are merged in a sequence in which the to-be-merged models are arranged in the model list. (2) The merged data in (1) are optimized.

In the merging process of (1), if the number of vertices and the number of bones change, values of vertex indexes need to be updated and values of bone indexes also need to be updated. Additionally, considering that each to-be-merged model includes a different amount of fusion morphology data, in the merging process of (1), if original fusion morphology data of a to-be-merged model does not include fusion morphology data blocks of another to-be-merged model, the fusion morphology data blocks not included may be merged into a buffer region of the original fusion morphology data and values of the fusion morphology data blocks may be a set value.

Meanwhile, a merging optimization of (2) is mainly performed on the buffer region of merged fusion morphology data. After the fusion morphology data are merged in (1), the buffer region includes invalid data regions filled with the set value and offset-free data having no morphology offsets and represented by the set value. At a merging optimization stage, the invalid data regions and the offset-free data may be removed so that valid fusion morphology data are formed with respect to vertices of the multiple to-be-merged models and the optimized merged mesh data are obtained.

Figure 3:
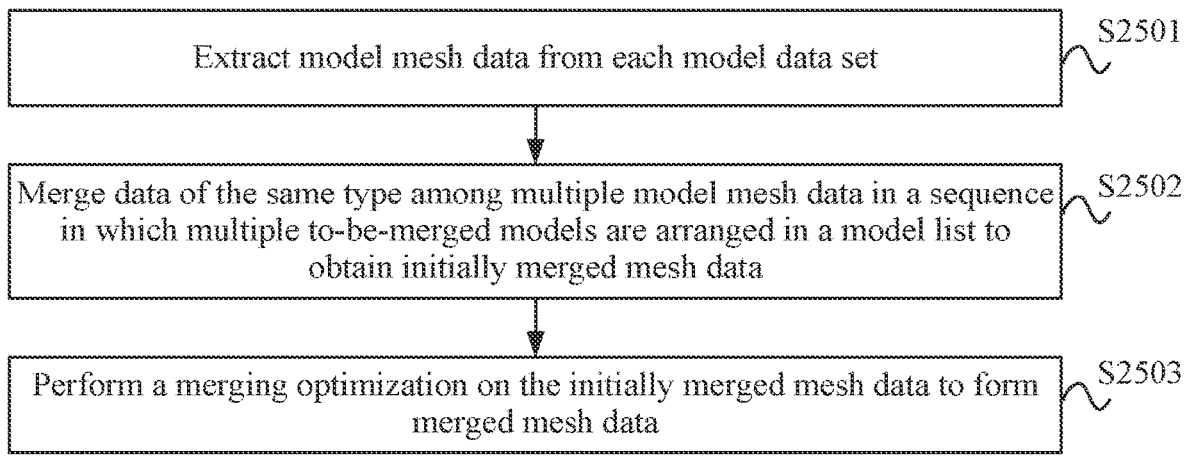
FIG. 3 is an implementation flowchart of the determination of merged mesh data in a batch rendering method according to an embodiment of the present disclosure.

In the embodiment, the step in which the data merging is performed in the model mesh property according to the model mesh data corresponding to each to-be-merged model so that the corresponding merged mesh data are obtained is described. FIG. 3 is an implementation flowchart of the determination of merged mesh data in a batch rendering method according to an embodiment of the present disclosure. The embodiment provides an implementation of the mesh data merging on the to-be-merged models in the model mesh property. Compared with the limitation that only the same material of the to-be-merged models is considered during the batch rendering, the merging in the model mesh property in the embodiment ensures the effective batch rendering on the character in the three-dimensional scene and expands an application range of the batch rendering.

As shown in FIG. 3, in the embodiment, the merged mesh data are determined through the steps described below.

In S2501, the model mesh data are extracted from each model data set.

For example, the model mesh data in the model mesh property may be extracted from the model data set of each to-be-merged model.

In S2502, the data of the same type among multiple model mesh data are merged in the sequence in which the multiple to-be-merged models are arranged in the model list so that initially merged mesh data are obtained.

For example, the sequence in which the multiple to-be-merged models are arranged in the model list may be used as a sequence in which multiple model mesh models are merged.

The model mesh data includes vertex-related data, skinned mesh data, and fusion morphology data. Therefore, multiple vertex-related data may be merged, multiple skinned mesh data may be merged, multiple fusion morphology data may be merged, and the merged data are denoted as the initially merged mesh data.

In the embodiment, the step in which the data of the same type among the multiple model mesh data are merged in the sequence in which the multiple to-be-merged models are arranged in the model list so that the initially merged mesh data are obtained is optimized to be the steps described below. The merging of the model mesh data through the steps described below can ensure the accuracy of the merged model mesh data and avoid a rendering error caused by a mesh data merging error in a rendering process.

The steps described below include (a11) to (e11).

(a11) The sequence in which the multiple to-be-merged models are arranged in the model list is used as a data merging sequence.

(b11) For vertex attribute data and vertex index offsets included in the model mesh data in the multiple model data sets, the vertex attribute data are merged and the vertex index offsets are updated in the data merging sequence so that vertex-related merged data are obtained.

For example, the vertex attribute data may include vertex coordinates, normals, tangents, shades, and the like. Therefore, data of the same type among multiple vertex attribute data may be merged separately and the vertex index offsets are updated so that the vertex-related merged data are obtained. For the update of the vertex index offsets, assuming that a first to-be-merged model includes 100 vertices and vertex index offsets of the vertices are 0 to 99 separately and assuming that a second to-be-merged model also includes 100 vertices and original vertex index offsets of the vertices are also 0 to 99, when mesh data of the first to-be-merged model and mesh data of the second to-be-merged model are merged, the mesh data of the second to-be-merged model follow the mesh data of the first to-be-merged model, and the vertex index offsets of the vertices in the second to-be-merged model need to be updated to be 100 to 199. Vertex index offsets of the subsequent to-be-merged model are updated by the same method.

(c11) For bone attribute data and bone index offsets included in the model mesh data in the multiple model data sets, the bone attribute data are merged and the bone index offsets are updated in the data merging sequence so that bone-related merged data are obtained.

For example, the skinned mesh data may include the bone attribute data and the bone index offsets, and the bone attribute data may include bone weights, binding postures, bone matrices, and the like. Similarly, data of the same type among multiple bone attribute data may be merged separately and the bone index offsets are updated so that the bone-related merged data are obtained. For the update of bone offsets, assuming that the first to-be-merged model includes a 10×10 bone matrix and bone index offsets of the bone matrix may be row offsets 0 to 9 and column offsets 0 to 9 and assuming that the second to-be-merged model also includes a 10×10 bone matrix and bone index offsets of the bone matrix are also row offsets 0 to 9 and column offsets 0 to 9, when the mesh data of the first to-be-merged model and the mesh data of the second to-be-merged model are merged, the bone matrix of the second to-be-merged model follows the bone matrix of the first to-be-merged model, and the bone index offsets of the bone matrix in the second to-be-merged model are row offsets 10 to 19 and column offsets 10 to 19.

(d11) For fusion morphology data blocks included in the model mesh data in the multiple model data sets, the fusion morphology data blocks are merged in the data merging sequence so that merged fusion morphology data are obtained.

For example, the model mesh data of each to-be-merged model include a certain amount of fusion morphology data and the to-be-merged models may include different fusion morphology data. In this step, the fusion morphology data blocks of the multiple to-be-merged models may be merged in the merging sequence so that the merged fusion morphology data are obtained.

During the merging of the fusion morphology data blocks, assuming that the first to-be-merged model includes two fusion morphology data blocks a and b and the second to-be-merged model includes two fusion morphology data blocks c and d, when the fusion morphology data blocks are merged, the two fusion morphology data blocks c and d need to be merged into the first to-be-merged model and data values of the two fusion morphology data blocks c and d may be labeled 0; similarly, the two fusion morphology data blocks a and b need to be merged into the second to-be-merged model and data values of the two fusion morphology data blocks a and b may also be labeled 0. Additionally, original fusion morphology data blocks of the to-be-merged model have no offsets, and the offset-free data may be represented by 0.

(e11) The vertex-related merged data, the bone-related merged data, and the merged fusion morphology data are used as the initially merged mesh data.

In the embodiment, data in a disk space where the vertex-related merged data, the bone-related merged data, and the merged fusion morphology data are recorded may be used as the initially merged mesh data.

In S2503, the merging optimization is performed on the initially merged mesh data so that the merged mesh data are formed.

In the embodiment, after the model mesh data corresponding to the to-be-merged models are initially merged in S2502, the initially merged mesh data can be acquired. In this step, the initially merged mesh data may be optimized. A region of the initially merged mesh data where the fusion morphology data blocks are recorded is optimized, where invalid data and offset-free data may be removed from a storage region of the fusion morphology data.

In the embodiment, the step in which the merging optimization is performed on the initially merged mesh data so that the merged mesh data are formed is optimized to be the steps described below. The optimization of the initially merged mesh data through the steps described below can effectively reduce a disk space occupied for storing the merged mesh data and shorten a time for acquired the merged mesh data when the batch rendering is performed.

The steps described below include (a12) to (c12).

(a12). The merged fusion morphology data included in the initially merged mesh data are extracted.

For example, this step is equivalent to the determination of a data storage region of the merged fusion morphology data.

(b12) The merged fusion morphology data are searched for invalid data filled with a set numerical value and offset-free data expressed by the set numerical value.

In the embodiment, the set numerical value is 0. It may be considered that 0 is used for representing the invalid data and the offset-free data in the storage region of the merged fusion morphology data. In this step, a storage region where the invalid data and the offset-free data are stored may be found.

To reduce an occupied memory space, the merged fusion morphology data are optimized in the embodiment, where the invalid data and the offset-free data represented by 0 may be removed during the merging optimization.

(c12) The invalid data and the offset-free data are removed so that merged fusion morphology data after removal are obtained, which constitute the merged mesh data after the merging optimization.

In this step, the invalid data and the offset-free data found above may be removed from the data storage region of the merged fusion morphology data, and only the merged fusion morphology data including effective offsets are retained so that the initially merged mesh data are optimized and the merged mesh data corresponding to the multiple to-be-merged models are obtained.

In S260, data merging is performed in a texture property according to a texture corresponding to each to-be-merged model so that corresponding merged texture data are obtained.

When a model is rendered, textures of the model are used. The image processor samples texture images and performs shade calculations so that shades of the textures can be mapped to pixels in a screen, implementing texture rendering on the model. Generally, textures used for rendering different models are often different. In the embodiment, to use the batch rendering, different textures used by the multiple to-be-merged models may be merged by the method in this step so that the merged texture data are obtained, which constitute a larger texture.

For example, for a texture merging process of the multiple to-be-merged models, a conventional texture merging method is to splice multiple textures with small dimensions into a texture with a large dimension. A main limitation of the conventional method is that GPU hardware samples a single texture whose maximum dimension is limited (for example, a maximum dimension of a texture supported by some rendering engines such as OpenGL ES 3.0 is 2048 or slightly higher, which mainly depends on the GPU hardware). Therefore, if small textures are directly spliced into a large texture, even under a maximum texture dimension, all the textures with small dimensions may still fail to be spliced.

Based on this, the embodiment provides a texture filling manner, which may be summarized as a manner of merging textures with small dimensions into a texture with a large dimension in conjunction with a texture array to perform texture merging more flexibly. A GPU may sample a texture array as a texture object. However, one texture array may actually include multiple array levels with the same texture dimension, and textures may be spliced on each array level and can be spliced to a dimension that reaches a maximum of a set texture dimension.

In an implementation of this step, a texture dimension may be set for the texture array according to a maximum dimension of the textures used by the multiple to-be-merged models so that each array level has the texture dimension. Then, the textures used by the multiple to-be-merged models may be filled into the texture array. In a filling process, a first array level of the texture array begins to be filled; when dimensions of textures filled into the first array level reach the texture dimension and there are still textures to be filled, a second array level is extended and the texture filling is continued; and the texture filling or the operation of extending an array level is cyclically performed until all the textures are filled. Finally, the merged texture data including the textures used by the multiple to-be-merged models are obtained.

Figure 4:
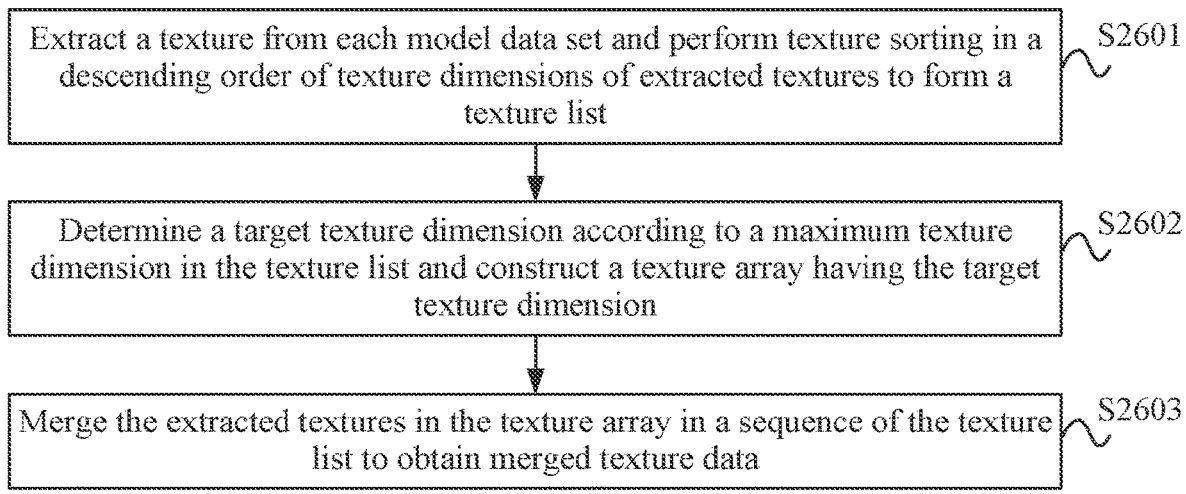
FIG. 4 is an implementation flowchart of the determination of merged texture data in a batch rendering method according to an embodiment of the present disclosure.

In the embodiment, the step in which the data merging is performed in the texture property according to the texture corresponding to each to-be-merged model so that the corresponding merged texture data are obtained is optimized. FIG. 4 is an implementation flowchart of the determination of merged texture data in a batch rendering method according to an embodiment of the present disclosure. The embodiment provides an implementation of the texture data merging on the to-be-merged models in the texture property. Compared with the operation of directly merging all texture data into a large texture region, the embodiment introduces the texture array. The texture used by each to-be-merged model is filled into the texture array so that the problem of a failure to effectively merge all textures due to a limited texture dimension is avoided while the texture data merging is implemented.

As shown in FIG. 4, the merged texture data are determined through the steps described below.

In S2601, the texture is extracted from each model data set and texture sorting is performed in a descending order of texture dimensions of extracted textures so that a texture list is formed.

In this step, the textures used by the multiple to-be-merged models are sorted in the descending order of the texture dimensions so that the texture list is obtained.

In S2602, a target texture dimension is determined according to a maximum texture dimension in the texture list and a texture array having the target texture dimension is constructed.

In this step, the maximum texture dimension may be determined from the texture list and then the target texture dimension may be determined as a texture dimension of each array level so that the texture array having the target texture dimension is constructed. The texture array, as the texture object, may be sampled by the GPU as a whole.

In the embodiment, the step in which the target texture dimension is determined according to the maximum texture dimension in the texture list and the texture array having the target texture dimension is constructed includes the steps described below. The construction of the texture array through the steps described below ensures that a texture buffer region is reasonably utilized to a maximum extent and that all the textures used by the to-be-merged models are effectively filled into the texture array.

The steps described below include (a21) and (b21).

(a21) The maximum texture dimension is converted into a power of 2, a range of the power of 2 where the maximum texture dimension is within is determined, and an upper limit of the range of the power of 2 is determined to be the target texture dimension.

For example, assuming that the maximum texture dimension is 2000, after converted into the power of 2, the maximum texture dimension is within a range of 210 to 211, and 211 (that is, 2048) may be considered as the upper limit of the range of the power of 2. Therefore, 2048 may be used as the target texture dimension.

(b21) The texture array including a set number of array levels is constructed and the texture dimension of each array level is set to be the target texture dimension.

The set number of array levels may be an array length of the texture array and is equivalent to a maximum number of layers to which the array level can be extended. The array length may be preset to be at least an integer greater than 0 and needs to ensure that the texture array constructed based on the array length can accommodate all the textures of the to-be-merged models. In this step, a texture dimension of a texture that each array level in the texture array can accommodate may be set to be the target texture dimension.

In S2603, the extracted textures are merged in the texture array in a sequence of the texture list so that the merged texture data are obtained.

The merging idea in this step may be described below. The textures in the texture list are filled one by one from layer 0 of the texture array. An array level where each texture is filled, a width and a height of the each texture, and pixel offsets of the each texture are recorded, so as to facilitate the subsequent texture sampling in the shader configured in the rendering pipeline. When a space of a current layer of the texture array is insufficient to accommodate a texture to be filled, a next array level is extended and the texture filling is performed in the newly extended array level; and the filling process is repeated until all the textures in the texture list are filled.

In the embodiment, the step in which the extracted textures are merged in the texture array in the sequence of the texture list so that the corresponding merged texture data are obtained includes the steps described below. The texture data merging through the steps described below can ensure the accuracy of the merged texture data and avoids the rendering error caused by the mesh data merging error in the rendering process.

The steps described below include (a22) and (g22).

(a22) A starting array level in the texture array is used as a current texture filling layer and a first texture in the texture list is used as a current texture.

This step is equivalent to an initialization step in which an initial current texture filling layer in the texture array and an initial current texture to be filled are determined.

(b22) The current texture is filled onto the current texture filling layer and texture filling information of the current texture is recorded in a set storage space.

Starting from an upper left corner of the current texture filling layer, the texture filling is performed from left to right. Meanwhile, an array level where the current texture is filled, width and height information of the current texture, and pixel offsets of the current texture within the filled array level may be determined. The array level where the current texture is filled may be a level number corresponding to the current texture filling layer. The above-determined information may be denoted as the texture filling information of the current texture, and the texture filling information may be recorded in the set storage space.

(c22) Whether all the textures are filled is determined. In the case where not all the textures are filled, step (d22) is performed. In the case where all the textures are filled, step (g22) is performed.

This step is equivalent to the determination of whether all the textures in the texture list are filled. If not all the textures are filled, step (d22) needs to be performed. If all the textures are filled, step (g22) may be performed.

(d22) A new current texture is selected in the sequence of the texture list.

If there is still a texture to be filled in the texture list, the new current texture may be selected in the sequence in this step.

(e22) Whether a remaining space of the current texture filling layer is greater than or equal to a texture dimension of the current texture is determined. In the case where the remaining space of the current texture filling layer is greater than or equal to the texture dimension of the current texture, step (b22) is performed. In the case where the remaining space of the current texture filling layer is less than the texture dimension of the current texture, step (f22) is performed.

After the new current texture is selected, whether the remaining space of the current texture filling layer is greater than or equal to the texture dimension of the current texture may be determined. If the remaining space of the current texture filling layer is greater than or equal to the texture dimension of the current texture, it indicates that the texture filling can still be performed in the current texture filling layer. Therefore, step (b22) may be performed to continue the texture filling. If the remaining space of the current texture filling layer is less than the texture dimension of the current texture, it indicates that the new current texture cannot be filled in the current texture filling layer. Step (f22) needs to be performed.

(f22) The next array level is extended as a new current texture filling layer and step (b22) is performed.

This step is equivalent to an operation of extending the new current texture filling layer. After extension, step (b22) may be performed to continue the texture filling.

(g22) The texture array filled with all the textures is used as the merged texture data.

Finally, after all the textures in the texture list are filled, the final merged texture data can be obtained in this step.

In S270, data merging is performed in a material attribute property according to a basic material attribute corresponding to each to-be-merged model so that corresponding merged material attribute data are obtained.

When the model is rendered, material attribute data of the model may also be used. Generally, a material may include multiple floating-point numbers or data attributes of a vector type. Material data may be transferred to the GPU by being acquired by the GPU so that shade calculations are performed. Generally, materials used for rendering different models are often different. In the embodiment, to perform the batch rendering on the to-be-merged models, different material attribute data may be merged into a large buffer region and bound into the rendering pipeline as the merged material attribute data during the batch rendering.

In the embodiment, the merged material attribute data may be stored in two manners: a storage buffer region of the shader and a floating-point texture. Considering compatibility with hardware, in the embodiment, the floating-point texture is used for storing the merged material attribute data.

The merged material attribute data of the to-be-merged models include basic material attributes and texture attributes. Therefore, in a process of merging material attribute data, the texture filling information recorded with respect to each texture in the texture merging process may be recorded, as texture attribute data, together with basic attribute data of the to-be-merged models.

Different from the model mesh data among which the data of the same type are merged, the material attribute data corresponding to each to-be-merged model constitute material instance data of the each to-be-merged model as a whole in the embodiment. Generally, the material instance data have an instance identifier with respect to the to-be-merged model. Material instance data of all the to-be-merged models may be merged in the sequence of the model list so that the merged material attribute data are formed.

The material instance data of the to-be-merged model mainly include two parts of material data information: one part is basic material attributes of the to-be-merged model, and the other part is texture filling information of a texture used for the texture rendering on the to-be-merged model. The merged material attribute data are written into the floating-point texture.

Figure 5:
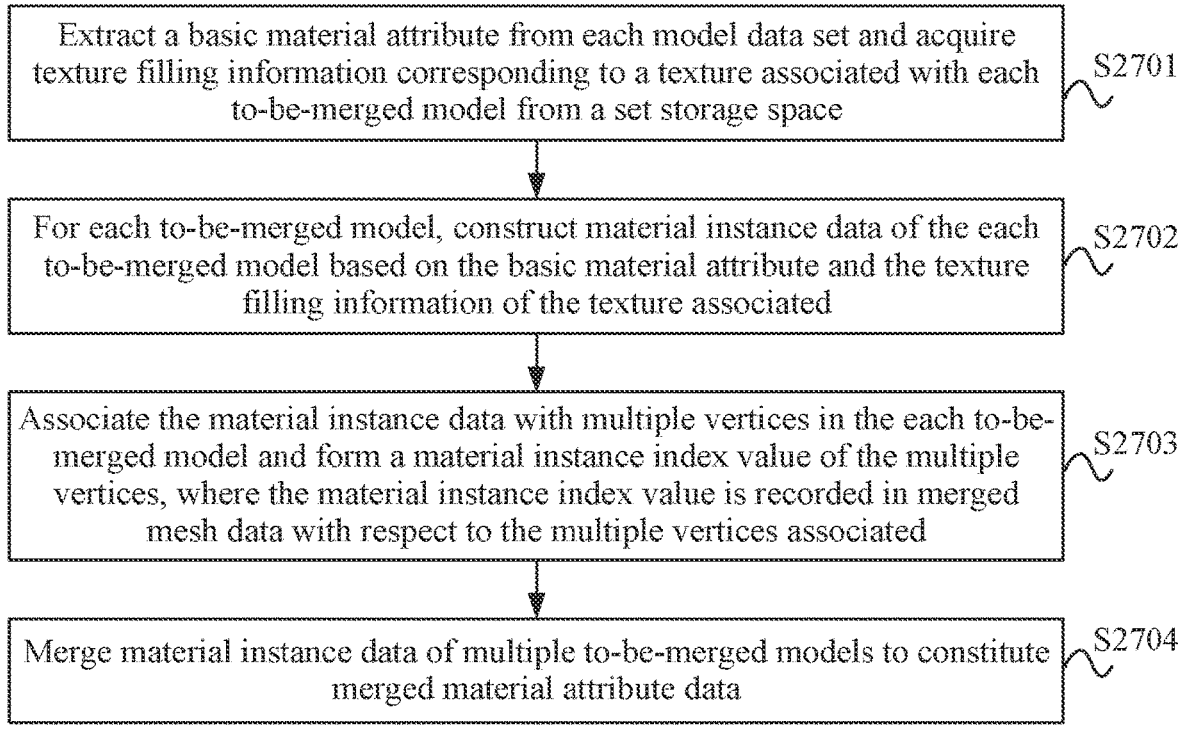
FIG. 5 is an implementation flowchart of the determination of merged material attribute data in a batch rendering method according to an embodiment of the present disclosure.

In the embodiment, the step in which the data merging is performed in the material attribute property according to the basic material attribute corresponding to each to-be-merged model so that the corresponding merged material attribute data are obtained is further optimized. FIG. 5 is an implementation flowchart of the determination of merged material attribute data in a batch rendering method according to an embodiment of the present disclosure.

The embodiment provides an implementation in which the material attribute data of the to-be-merged models are merged in the material attribute property. In an implementation of the batch rendering, to-be-rendered models with the same material are searched so that to-be-merged models are obtained. Since the to-be-merged models have the same material, the merging of material attribute data does not need to be considered. However, the batch rendering method provided in the embodiment is not limited to the batch rendering on the to-be-rendered models with the same material. Therefore, merging the material attribute data of the multiple to-be-merged models need to be considered in the material attribute property. Material attribute rendering in the embodiment is equivalent to the improvement of the method provided in the embodiment. The improvement reflects the flexibility of the batch rendering method provided in the embodiment and expands the application range of the batch rendering method.

As shown in FIG. 5, the merged material attribute data are determined through the steps described below.

In S2701, the basic material attribute is extracted from each model data set and texture filling information corresponding to the texture associated with each to-be-merged model is acquired from the set storage space.

In this step, two parts of material attribute data are obtained with respect to each to-be-merged model, where one part is the basic material attribute of the to-be-merged model, such as a color attribute, a transparency attribute, and a brightness attribute, and the other part is the texture filling information corresponding to the texture associated with the to-be-merged model and used for the texture rendering. The texture filling information is determined and recorded in the texture merging process.

In S2702, for each to-be-merged model, the material instance data of the each to-be-merged model are constructed based on the basic material attribute and the texture filling information of the texture associated.

This step is mainly the construction of the material instance data with respect to each to-be-merged model based on the above-determined two parts of data information.

In S2703, the material instance data are associated with multiple vertices in the each to-be-merged model and a material instance index value of the multiple vertices is formed, where the material instance index value is recorded in the merged mesh data with respect to the vertices associated.

For convenience to read material attribute data required for shading vertices of each to-be-merged model from the merged material attribute data, the multiple vertices of the each to-be-merged model may be associated with the corresponding material instance data through the material instance index value in this step. For example, if an instance identifier of material instance data corresponding to a to-be-merged model is known and multiple vertices of the to-be-merged model are known, the instance identifier of the material instance data may be used as a material instance index value of the multiple vertices of the to-be-merged model, and the material instance index value is recorded in the above-formed merged mesh data in correspondence with the multiple vertices.

In S2704, material instance data of the multiple to-be-merged models are merged to constitute the merged material attribute data.

The material instance data of the multiple to-be-merged models may be merged so that the material attribute data recorded in the floating-point texture are formed. In the embodiment, a data length of the merged material attribute data corresponding to each to-be-merged model may be known. Generally, the texture filling information and the basic material attributes of the multiple to-be-merged models correspond to a fixed data length.

In S280, the merged data in each of the merging properties are acquired based on a generated batch rendering instruction so that a rendering presentation of images corresponding to the searched to-be-merged models is performed.

After the data merging is performed on the multiple to-be-merged models in each merging property through the preceding steps, the batch rendering instruction may be generated in this step and may be sent to the image processor so that the batch rendering is performed on multiple to-be-merged models of the to-be-rendered character in one rendering batch.

In the embodiment, the model data associated with the multiple to-be-merged models of the to-be-rendered character need to be merged only once, and the merged data stored after the merging may be used as rendering data, so as to implement the complete rendering of the to-be-rendered character with respect to the multiple to-be-merged models. The model data do not need to be repeatedly merged under each image rendering frame.

Based on the technical solutions provided in the preceding embodiment, the embodiment of the present disclosure optimizes a process of searching the to-be-merged models and describes an implementation in which the model data are merged in each merging property. In the embodiments of the present disclosure, merging the model data of the to-be-merged models is considered in three properties separately, which are the model mesh data, the texture, and the material attribute. After the merging, the batch rendering is performed only once so that the effective rendering on the multiple to-be-merged models can be implemented. Among the model mesh data, data associated with bone animation and expression deformation can also be effectively merged, solving the problem in the related art of a failure to effectively merge data associated with bone animation and expression deformation and ensuring the effective batch rendering on the character object such as the person and the animal in the three-dimensional scene. In this manner, the rendering efficiency of character rendering in the three-dimensional scene is ensured and the application range of the batch rendering is better expanded.

As another embodiment of the embodiments of the present disclosure, based on the preceding embodiment, the embodiment includes that model data of an independent rendering model are acquired based on an independent rendering instruction generated with respect to the independent rendering model so that a rendering presentation of an image corresponding to the independent rendering model is performed, where the independent rendering model is a to-be-searched model in the model list, which is not merged.

Except the to-be-merged models that satisfy the batch rendering condition, some to-be-rendered models on which the batch rendering cannot be performed also exist with respect to the to-be-rendered character. In the embodiment, the to-be-rendered models on which the batch rendering cannot be performed are denoted as independent rendering models. Through the embodiments of the present disclosure, a rendering instruction (denoted as the independent rendering instruction) may be formed with respect to each independent rendering model so that the image processor acquires the corresponding model data set based on the independent rendering instruction, thereby implementing the rendering presentation of the image corresponding to the independent rendering model. As another embodiment of the embodiments of the present disclosure, based on the preceding embodiment, the embodiment provides implementation steps for the image processor to perform the rendering presentation of the images corresponding to the searched to-be-merged models based on the batch rendering instruction.

(a31) The generated batch rendering instruction is analyzed and a rendering pipeline for rendering the searched to-be-merged models is determined.

In the embodiment, the multiple to-be-merged models are rendered by using the same rendering pipeline. The execution body may analyze the batch rendering instruction to determine the rendering pipeline on which the rendering depends. For example, the shader, the front/back culling mode, the depth template testing state, and the mixing state configured in the rendering pipeline may be acquired.

(b31) The merged data in each of the merging properties are read and the merged data in each of the merging properties are acquired through the rendering pipeline so that the rendering presentation of the images corresponding to the searched to-be-merged models is performed.

After the batch rendering instruction is generated and it is determined that a batch rendering operation is to be performed, the merged data of the multiple to-be-merged models in each of the merging properties may be read from a local disk and sent to the shader in the rendering pipeline. The shader can perform the rendering presentation of the images corresponding to the multiple to-be-merged models by calculating the acquired merged detain each of the merging properties.

For example, the shader may acquire data required for material rendering from the merged material attribute data. Considering that the shader performs the rendering in units of triangular facets, that is, the shader needs to acquire a material attribute of each vertex, a material instance index value recorded in association with each vertex may be acquired through an identifier of the each vertex in the merged mesh data and based on the material instance index values, the material attribute of the vertex may obtained from the floating-point texture, thereby implementing the material rendering on the vertex.

In a testing scenario, performance testing is performed on the batch rendering method provided in the embodiment. The testing scenario may be described below. When 50 character-related models are rendered, 2900,000 triangular facets need to be rendered and 2500,000 vertices are included. If the method provided in the embodiment is not used and only a conventional general rendering method applicable to commercial rendering engines is used, to render the preceding 50 models, 2108 rendering instructions need to be sent to the image processor and the measured rendering frame rate is only 37.6 FPS. If the rendering is performed using the method applicable to character rendering and provided in the embodiment, to render the preceding 50 models, only 308 rendering instructions need to be sent to the image processor and the measured rendering frame rate can reach 76.3 FPS.

As can be found from the preceding testing results, the batch rendering method applicable to character rendering and provided in the embodiment greatly reduces rendering batches, optimizes the rendering performance of the character rendering, and improves a frame rate.

For ease of understanding the batch rendering method provided in the embodiment, the embodiment provides the example description below.

It is assumed that model 1 and model 2 are two three-dimensional models representing one character and it is determined that model 1 and model 2 use the same rendering pipeline. Thus, model 1 and model 2 may be considered as two to-be-merged models.

Figure 6:
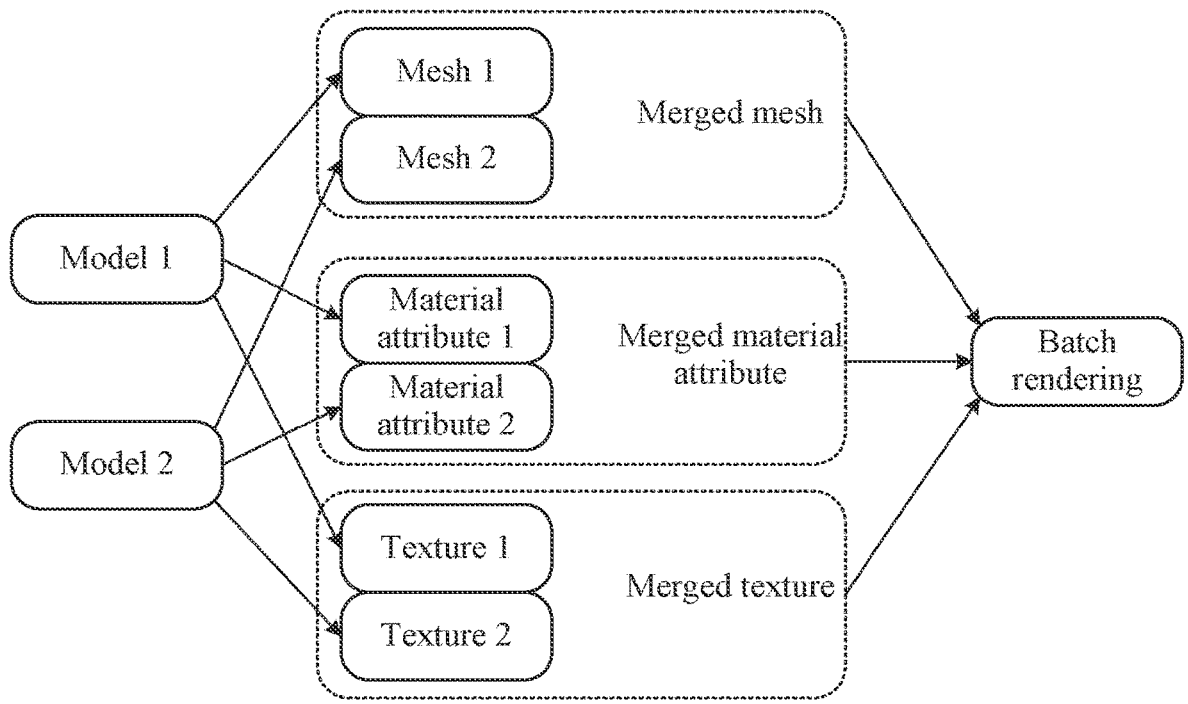
FIG. 6 is an example flowchart showing the implementation of a batch rendering method according to an embodiment of the present disclosure.

FIG. 6 is an example flowchart showing the implementation of a batch rendering method according to an embodiment of the present disclosure. As shown in FIG. 6, a process of performing batch rendering on model 1 and model 2 by the method provided in the embodiment may be described below.

Model 1 has model data in three properties: mesh 1, material attribute 1, and texture 1; and model 2 has model data in three properties: mesh 2, material attribute 2, and texture 2. By use of the method provided in the embodiment, model mesh data of mesh 1 and mesh 2 may be merged to constitute a merged mesh; material attribute data of material attribute 1 and material attribute 2 may be merged to constitute a merged material attribute; texture data of texture 1 and texture 2 may also be merged to constitute a merged texture; and finally, a batch rendering instruction is sent to a GPU and the GPU may acquire merged data including the merged mesh, the merged material attribute, and the merged texture through the batch rendering instruction, implementing a rendering presentation of images corresponding to model 1 and model 2.

Figure 7:
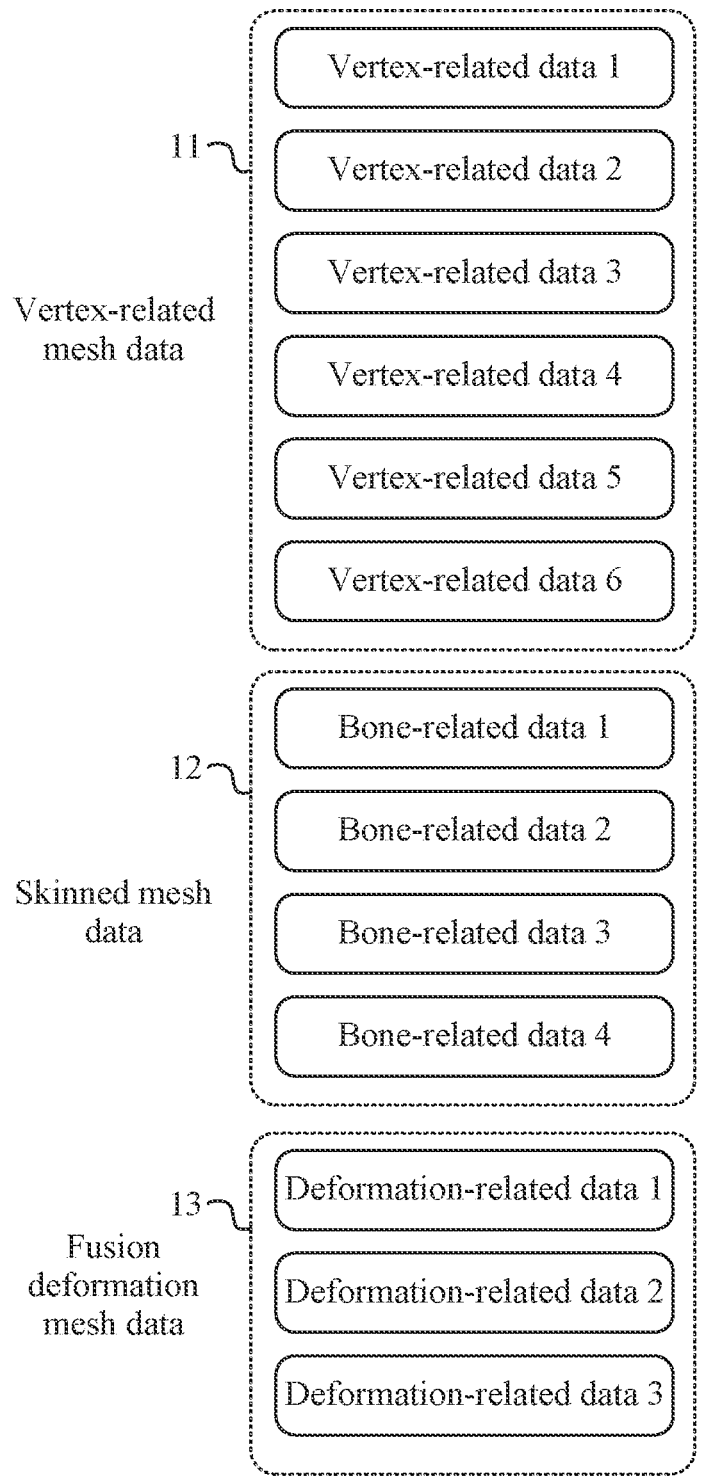
FIG. 7 is a diagram showing a data structure of model mesh data of to-be-merged models in an example implementation of a batch rendering method according to an embodiment of the present disclosure.

FIG. 7 is a diagram showing a data structure of model mesh data of to-be-merged models in an example implementation of a batch rendering method according to an embodiment of the present disclosure. As shown in FIG. 7, mesh data include vertex-related mesh data 11, skinned mesh data 12, and fusion morphology mesh data 13; where vertex-related mesh data 11 include vertex description-related data, for example, mesh data such as vertex attribute-related data and vertex index offsets; the skinned mesh data 12 include bone description-related data, for example, data information such as bone attribute-related data and bone index offsets; and fusion morphology mesh data 13 include fusion morphology description-related data, for example, data information such as incremental offsets of data related to face deformation. Different types of mesh data included in model 1 and the model 2 and shown in FIG. 7 may be merged separately so that merged mesh data are finally obtained. The merged mesh data include updated vertex index offsets and updated bone index offsets. Fusion morphology data are compressed and valid merged fusion morphology data are retained ultimately.

Figure 8:
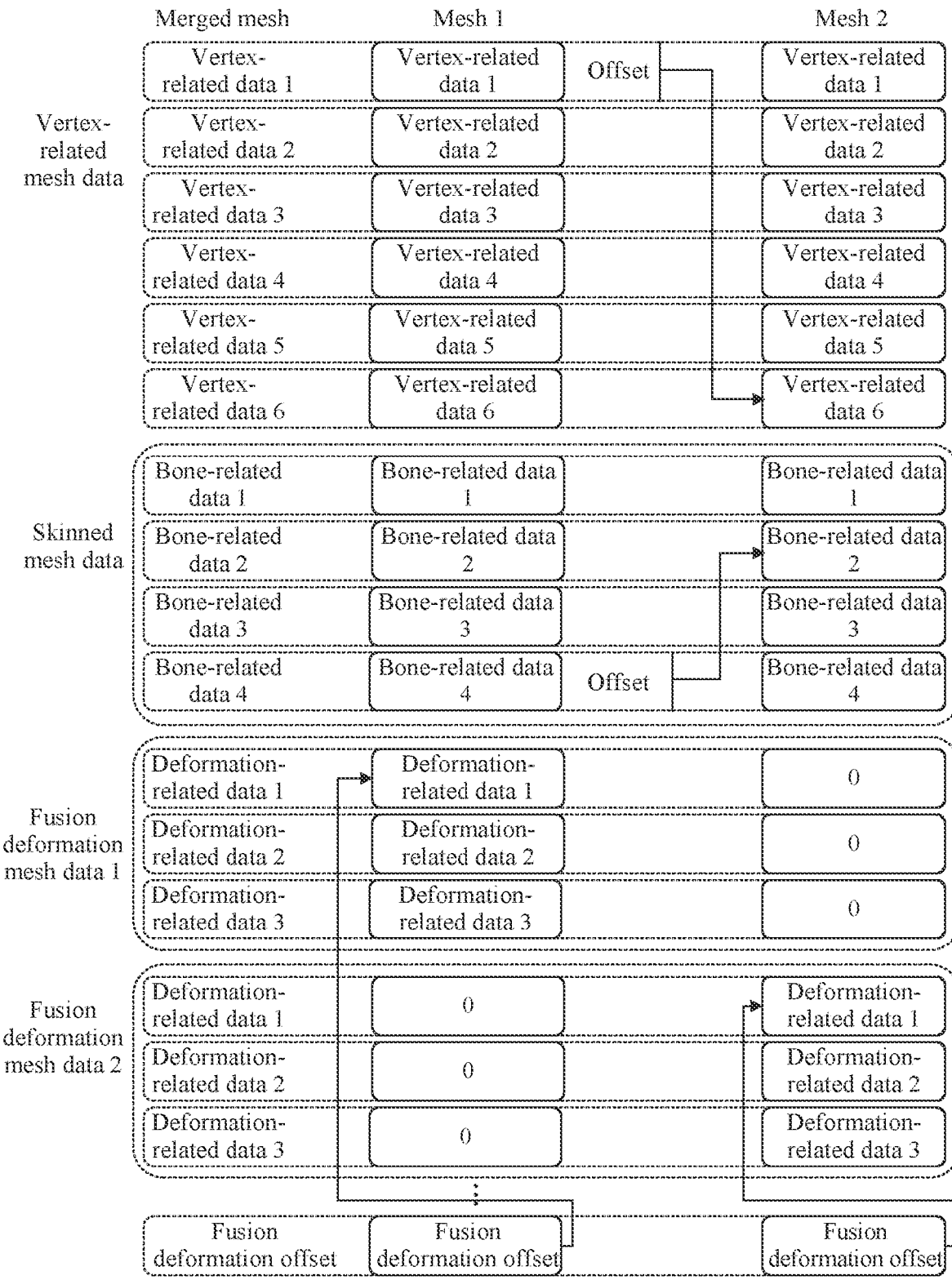
FIG. 8 is a diagram showing a merging result of model mesh data of to-be-merged models in an example implementation of a batch rendering method according to an embodiment of the present disclosure.

FIG. 8 is a diagram showing a merging result of model mesh data of to-be-merged models in an example implementation of a batch rendering method according to an embodiment of the present disclosure. As shown in FIG. 8, data of the same type among different model mesh data of model 1 and model 2 are merged; the merged mesh data finally obtained include vertex index offsets and bone index offsets which are updated with respect to offset values in the original model mesh data; and the fusion morphology data are compressed after merged and only the valid merged fusion morphology data are retained ultimately.

Figure 9:
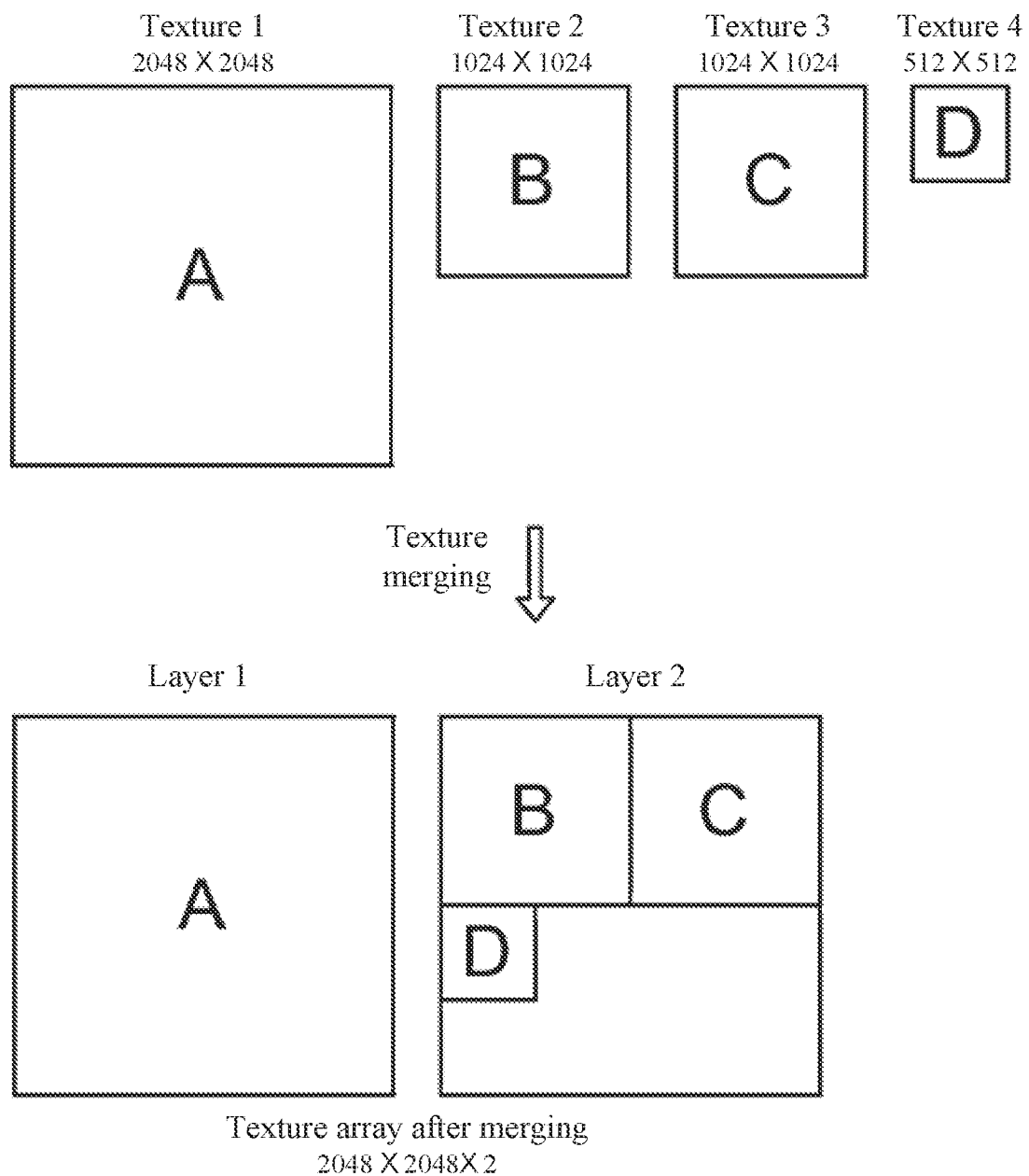
FIG. 9 is a diagram showing a merging result of texture data of to-be-merged models in an example implementation of a batch rendering method according to an embodiment of the present disclosure.

FIG. 9 is a diagram showing a merging result of texture data of to-be-merged models in an example implementation of a batch rendering method according to an embodiment of the present disclosure. As shown in FIG. 9, model 1 and model 2 include four textures in total, which are texture 1, texture 2, texture 3, and texture 4, separately. After texture merging, texture 1 may be filled into a first level of a texture array, and textures 2 to 4 may be filled into a second level of the texture array.

FIG. 10 is a diagram showing a merging result of material attribute data of to-be-merged models in an example implementation of a batch rendering method according to an embodiment of the present disclosure. As shown in FIG. 10, model 1 and model 2 correspond to material instance 1 and material instance 2, respectively, and each material instance includes texture filling information of a texture used by the corresponding model (where the texture filling information is recorded in correspondence with the texture in a texture merging process and includes, for example, an array level where the texture is located, a width and a height of the texture, pixel offsets, and the like) and basic material attributes.

Figure 11:
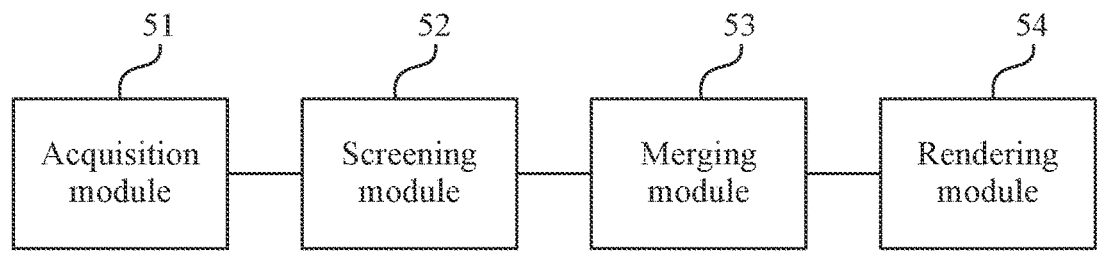
FIG. 11 is a structural diagram of a batch rendering apparatus according to an embodiment of the present disclosure.

FIG. 11 is a structural diagram of a batch rendering apparatus according to an embodiment of the present disclosure. As shown in FIG. 11, the apparatus includes an acquisition module 51, a determination module 52, a merging module 53, and a rendering module 54.

The acquisition module 51 is configured to acquire a model list corresponding to a to-be-rendered character, where the model list includes at least one to-be-rendered three-dimensional model.

The determination module 52 is configured to search the at least one to-be-rendered three-dimensional model according to a preset batch rendering condition to determine to-be-merged models, where each of the to-be-merged models is a to-be-rendered three-dimensional model satisfying the preset batch rendering condition.

The merging module 53 is configured to perform model data merging in set different merging properties according to model data sets corresponding to the determined to-be-merged models to obtain merged data in each of the merging properties.

The rendering module 54 is configured to acquire the merged data in each of the merging properties based on a generated batch rendering instruction to perform a rendering presentation of images corresponding to the searched to-be-merged models.

According to the technical solution provided in the embodiment of the present disclosure, batch rendering on the to-be-rendered character is proposed. To-be-rendered models corresponding to the to-be-rendered character in a three-dimensional scene may be used as to-be-merged individuals, multiple to-be-merged models on which the batch rendering is performed are selected from multiple to-be-rendered models, and the model data sets associated with the multiple to-be-merged models are merged in the different merging properties, so that the batch rendering is performed on multiple to-be-rendered models of the to-be-rendered character. Additionally, in an implementation of the batch rendering, merging different types of model data is considered in different merging properties in the technical solution, thereby avoiding the problem of a failure to directly merge different model data and implementing effective batch rendering on a character such as a person and an animal in the three-dimensional scene.

In an embodiment, the determination module 52 is configured to acquire a rendering pipeline for rendering each to-be-rendered model in an image processor and search to-be-rendered models with the same rendering pipeline as the to-be-merged models. The rendering pipeline includes one or more of a shader, a front/back culling mode, a depth template testing state, or a mixing state.

In an embodiment, the merging module 53 may include a data acquisition unit, a mesh merging unit, a texture merging unit, and a material merging unit.

The data acquisition unit is configured to acquire multiple model data sets which correspond to the multiple to-be-merged models, respectively, where each of the model data sets includes model mesh data, a texture, and a basic material attribute. The mesh merging unit is configured to perform data merging in a model mesh property according to model mesh data corresponding to each to-be-merged model to obtain corresponding merged mesh data. The texture merging unit is configured to perform data merging in a texture property according to a texture corresponding to each to-be-merged model to obtain corresponding merged texture data. The material merging unit is configured to perform data merging in a material attribute property according to a basic material attribute corresponding to each to-be-merged model to obtain corresponding merged material attribute data.

In an embodiment, the mesh merging unit may include a first extraction subunit, an initial merging subunit, and a merging optimization subunit.

The first extraction subunit is configured to extract the model mesh data from each model data set. The initial merging subunit is configured to merge data of the same type among model mesh data in the multiple model data sets in a sequence in which the multiple to-be-merged models are arranged in the model list to obtain initially merged mesh data. The merging optimization subunit is configured to perform a merging optimization on the initially merged mesh data to form the merged mesh data.

In an embodiment, the initial merging subunit is configured to use the sequence in which the multiple to-be-merged models are arranged in the model list as a data merging sequence; for vertex attribute data and vertex index offsets included in the model mesh data in the multiple model data sets, merge the vertex attribute data and update the vertex index offsets in the data merging sequence to obtain vertex-related merged data; for bone attribute data and bone index offsets included in the model mesh data in the multiple model data sets, merge the bone attribute data and update the bone index offsets in the data merging sequence to obtain bone-related merged data; for fusion morphology data blocks included in the model mesh data in the multiple model data sets, merge the fusion morphology data blocks in the data merging sequence to obtain merged fusion morphology data; and use the vertex-related merged data, the bone-related merged data, and the merged fusion morphology data as the initially merged mesh data.

In an embodiment, the merging optimization subunit is configured to extract the merged fusion morphology data included in the initially merged mesh data; search the merged fusion morphology data for invalid data filled with a set numerical value and offset-free data expressed by the set numerical value; and remove the invalid data and the offset-free data to obtain merged fusion morphology data after removal, which constitute the merged mesh data after the merging optimization.

In an embodiment, the texture merging unit may include a second extraction subunit, an array construction subunit, and a texture merging subunit.

The second extraction subunit is configured to extract the texture from each model data set and perform texture sorting in a descending order of texture dimensions of extracted textures to form a texture list. The array construction subunit is configured to determine a target texture dimension according to a maximum texture dimension in the texture list and construct a texture array having the target texture dimension. The texture merging subunit is configured to merge the extracted textures in the texture array in a sequence of the texture list to obtain the corresponding merged texture data.

In an embodiment, the array construction subunit is configured to convert the maximum texture dimension into a power of 2, determine a range of the power of 2 where the maximum texture dimension is within, and determine an upper limit of the range of the power of 2 to be the target texture dimension; and construct the texture array including a set number of array levels and setting a texture dimension of each of the array levels to be the target texture dimension.

In an embodiment, the texture merging subunit is configured to use a starting array level in the texture array as a current texture filling layer and use a first texture in the texture list as a current texture; fill the current texture onto the current texture filling layer and record texture filling information of the current texture in a set storage space; in the case where not all the textures are filled, select a new current texture in the sequence of the texture list; in the case where a remaining space of the current texture filling layer is greater than or equal to a texture dimension of the current texture, perform a texture filling operation; in the case where the remaining space of the current texture filling layer is less than the texture dimension of the current texture, extend a next array level as a new current texture filling layer and perform the texture filling operation; and in the case where all the textures are filled, use the texture array filled with all the textures as the merged texture data.

In an embodiment, the material merging unit is configured to extract the basic material attribute from each of the multiple model data sets and acquire texture filling information corresponding to a texture associated with each of the multiple to-be-merged models from the set storage space; for each to-be-merged model of the multiple to-be-merged models, construct material instance data of the each to-be-merged model based on the basic material attribute and the texture filling information of the texture associated; associate the material instance data with multiple vertices in the each to-be-merged model and form a material instance index value of the multiple vertices, where the material instance index value is recorded in the merged mesh data in correspondence with the multiple vertices associated; and merge material instance data of the multiple to-be-merged models to constitute the merged material attribute data.

In an embodiment, the apparatus may further include an independent instruction sending module.

The independent instruction sending module is configured to acquire model data of an independent rendering model based on an independent rendering instruction generated with respect to the independent rendering model to perform a rendering presentation of an image corresponding to the independent rendering model. The independent rendering model is a to-be-searched model in the model list, which is not merged.

In an embodiment, the apparatus may be configured through the image processor to analyze the received batch rendering instruction and determine a rendering pipeline for rendering the searched to-be-merged models; and read the merged data in each of the merging properties and acquire the merged data in each of the merging properties through the rendering pipeline to perform the rendering presentation of the images corresponding to the searched to-be-merged models.

The batch rendering apparatus provided in the embodiment of the present disclosure may perform the batch rendering method provided in any embodiment of the present disclosure and has function modules and effects corresponding to the method performed.

Multiple units and modules included in the preceding apparatus are divided according to function logic, and these units and modules may also be divided in other manners as long as the corresponding functions can be achieved. Moreover, the names of multiple function units are used for distinguishing between each other and not intended to limit the scope of embodiments of the present disclosure.

Figure 12:
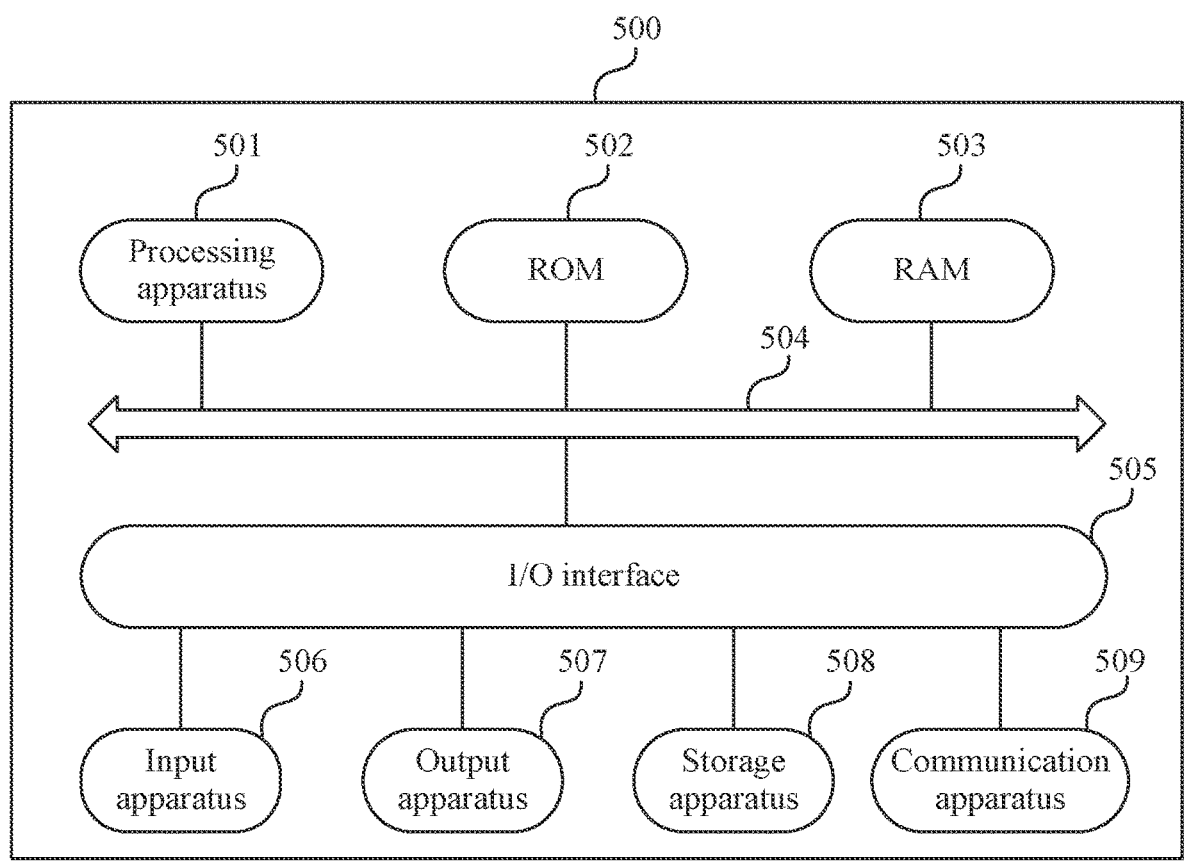
FIG. 12 is a structural diagram of an electronic device according to an embodiment of the present disclosure.

FIG. 12 is a structural diagram of an electronic device according to an embodiment of the present disclosure. Referring to FIG. 12, FIG. 12 shows a structural diagram of an electronic device (such as a terminal device or a server in FIG. 11) 500 suitable for implementing embodiments of the present disclosure. The terminal device in the embodiments of the present disclosure may include, but is not limited to, mobile terminals such as a mobile phone, a laptop, a digital broadcast receiver, a personal digital assistant (PDA), a portable Android device (PAD), a portable media player (PMP), and an in-vehicle terminal (such as an in-vehicle navigation terminal) and stationary terminals such as a digital television (TV) and a desktop computer. The electronic device 500 shown in FIG. 12 is merely an example and should not impose any limitation to the function and usage scope of the embodiments of the present disclosure.

As shown in FIG. 12, the electronic device 500 may include a processing apparatus (such as a central processing unit or a graphics processing unit) 501. The processing apparatus 501 may perform multiple proper actions and processing according to a program stored in a read-only memory (ROM) 502 or a program loaded into a random-access memory (RAM) 503 from a storage apparatus 508. Multiple programs and data required for operations of the electronic device 500 are also stored in the RAM 503. The processing apparatus 501, the ROM 502, and the RAM 503 are connected to each other via a bus 504. An input/output (I/O) interface 505 is also connected to the bus 504.

Generally, the following apparatuses may be connected to the I/O interface 505: an input apparatus 506 including, for example, a touchscreen, a touchpad, a keyboard, a mouse, a camera, a microphone, an accelerometer, and a gyroscope; an output apparatus 507 including, for example, a liquid crystal display (LCD), a speaker, and a vibrator; the storage apparatus 508 including, for example, a magnetic tape and a hard disk; and a communication apparatus 509. The communication apparatus 509 may allow the electronic device 500 to perform wireless or wired communication with other devices to exchange data. Although FIG. 7 shows the electronic device 500 having multiple apparatuses, it is not required to implement or have all the shown apparatuses. Alternatively, more or fewer apparatuses may be implemented or present.

According to the embodiments of the present disclosure, the process described above with reference to a flowchart may be implemented as a computer software program. For example, a computer program product is included in the embodiments of the present disclosure. The computer program product includes a computer program carried in a non-transitory computer-readable medium. The computer program includes program codes for executing the method shown in the flowchart. In such embodiments, the computer program may be downloaded and installed from a network through the communication apparatus 509, installed from the storage apparatus 508, or installed from the ROM 502. When the computer program is executed by the processing apparatus 501, the preceding functions defined in the methods in the embodiments of the present disclosure are implemented.

Names of messages or information exchanged between multiple apparatuses in embodiments of the present disclosure are used for an illustrative purpose and are not to limit the scope of such messages or information.

The electronic device provided in the embodiment of the present disclosure and the batch rendering methods provided in the preceding embodiments belong to the same concept. For technical details not described in detail in the embodiment, reference may be made to the preceding embodiments. The embodiment has the same effects as the preceding embodiments.

An embodiment of the present disclosure provides a computer storage medium storing a computer program which, when executed by a processor, causes the processor to perform the batch rendering method provided in the preceding embodiments.

The preceding computer-readable medium in the present disclosure may be a computer-readable signal medium or a computer-readable storage medium or any combination thereof. For example, the computer-readable storage medium may be, but is not limited to, an electrical, magnetic, optical, electromagnetic, infrared, or semiconductor system, apparatus, or device or any combination thereof. Examples of the computer-readable storage medium may include, but are not limited to, an electrical connection having one or more wires, a portable computer disk, a hard disk, a RAM, a ROM, an erasable programmable read-only memory (EPROM) or a flash memory, an optical fiber, a portable compact disc read-only memory (CD-ROM), an optical memory device, a magnetic memory device, or any suitable combination thereof. In the present disclosure, the computer-readable storage medium may be any tangible medium including or storing a program. The program may be used by an instruction execution system, apparatus, or device or used in conjunction with an instruction execution system, apparatus, or device. In the present disclosure, the computer-readable signal medium may include a data signal propagated in a baseband or as a part of a carrier, and computer-readable program codes are carried in the data signal. The data signal propagated in this manner may be in multiple forms, including, but not limited to, an electromagnetic signal, an optical signal, or any suitable combination thereof. The computer-readable signal medium may also be any computer-readable medium except the computer-readable storage medium. The computer-readable signal medium may send, propagate, or transmit a program used by an instruction execution system, apparatus, or device or used in conjunction with an instruction execution system, apparatus, or device. The program codes included on the computer-readable medium may be transmitted by any suitable medium, including, but not limited to, a wire, an optical cable, a radio frequency (RF), or any suitable combination thereof.

In some embodiments, clients and servers may communicate by using any network protocol currently known or developed in the future, such as a Hypertext Transfer Protocol (HTTP), and may be interconnected to any form or medium of digital data communication (for example, a communication network). Examples of the communication network include a local area network (LAN), a wide area network (WAN), an inter-network (for example, the Internet), a peer-to-peer network (for example, an ad hoc network), and any network currently known or developed in the future.

The preceding computer-readable medium may be included in the preceding electronic device or may exist alone without being assembled into the electronic device.

The preceding computer-readable medium carries one or more programs, where the one or more programs, when executed by the electronic device, cause the electronic device to perform the steps described below.

The preceding computer-readable medium carries one or more programs, where the one or more programs, when executed by the electronic device, cause the electronic device to: acquire a model list corresponding to a to-be-rendered character, where the model list includes at least one to-be-rendered three-dimensional model; search the at least one to-be-rendered three-dimensional model according to a preset batch rendering condition to determine to-be-merged models, where each of the to-be-merged models is a to-be-rendered three-dimensional model satisfying the preset batch rendering condition; perform model data merging in set different merging properties according to model data sets corresponding to the searched to-be-merged models to obtain merged data in each of the merging properties; and acquire the merged data in each of the merging properties based on a generated batch rendering instruction to perform a rendering presentation of images corresponding to the searched to-be-merged models.

Computer program codes for executing operations in the present disclosure may be written in one or more programming languages or a combination thereof. The preceding programming languages include, but are not limited to, object-oriented programming languages such as Java, Smalltalk, and C++ and also include conventional procedural programming languages such as C or similar programming languages. Program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a LAN or a WAN or may be connected to an external computer (for example, via the Internet through an Internet service provider).

Flowcharts and block diagrams among the drawings illustrate architectures, functions, and operations possible to implement in accordance with the system, method, and computer program product in multiple embodiments of the present disclosure. In this regard, each block in the flowcharts or block diagrams may represent a module, program segment, or part of codes, where the module, program segment, or part of codes includes one or more executable instructions for implementing specified logical functions. It is to be noted that in some alternative implementations, functions marked in blocks may occur in an order different from that marked in the drawings. For example, two successive blocks may, in fact, be executed substantially in parallel or in reverse order, which depends on the functions involved. It is also to be noted that each block in the block diagrams and/or flowcharts and a combination of blocks in the block diagrams and/or flowcharts may be implemented by a special-purpose hardware-based system executing a specified function or operation or may be implemented by a combination of special-purpose hardware and computer instructions.

The involved units described in the embodiments of the present disclosure may be implemented by software or hardware. The name of a unit is not intended to limit the unit itself in one case. For example, a first acquisition unit may be described as "a unit for acquiring at least two Internet Protocol addresses".

The functions described above herein may be at least partially implemented by one or more hardware logic components. For example, without limitation, example types of hardware logic component that can be used include a field-programmable gate array (FPGA), an application-specific integrated circuit (ASIC), an application specific standard parts (ASSP), a system-on-chip (SoC), a complex programmable logic device (CPLD), and the like.

In the context of the present disclosure, a machine-readable medium may be a tangible medium that may include or store a program used by an instruction execution system, apparatus, or device or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device or any suitable combination thereof. Examples of the machine-readable storage medium include an electrical connection based on one or more wires, a portable computer disk, a hard disk, a RAM, a ROM, an EPROM or a flash memory, an optical fiber, a CD-ROM, an optical storage device, a magnetic storage device, or any suitable combination thereof.

According to one or more embodiments of the present disclosure, [example one] provides a batch rendering method. The method includes: acquiring a model list corresponding to a to-be-rendered character, where the model list includes at least one to-be-rendered three-dimensional model; searching the at least one to-be-rendered three-dimensional model according to a preset batch rendering condition to determine to-be-merged models, where each of the to-be-merged models is a to-be-rendered three-dimensional model satisfying the preset batch rendering condition; performing model data merging in set different merging properties according to model data sets corresponding to the searched to-be-merged models to obtain merged data in each of the merging properties; and acquiring the merged data in each of the merging properties based on a generated batch rendering instruction to perform a rendering presentation of images corresponding to the searched to-be-merged models.

According to one or more embodiments of the present disclosure, [example two] provides the batch rendering method. The step of searching the at least one to-be-rendered three-dimensional model according to the preset batch rendering condition to determine to-be-merged models includes: acquiring a rendering pipeline for rendering each to-be-rendered model in an image processor; and searching to-be-rendered models with the same rendering pipeline as the obtained to-be-merged models; where the rendering pipeline includes one or more of a shader, a front/back culling mode, a depth template testing state, or a mixing state.

According to one or more embodiments of the present disclosure, [example three] provides the batch rendering method. The step of performing the model data merging in the set different merging properties according to the model data sets corresponding to the searching to-be-merged models to obtain the merged data in each of the merging properties includes: acquiring multiple model data sets which correspond to multiple to-be-merged models, respectively, where each of the multiple model data sets includes model mesh data, a texture, and a basic material attribute; performing data merging in a model mesh property according to model mesh data corresponding to each of the multiple to-be-merged models to obtain corresponding merged mesh data; performing data merging in a texture property according to a texture corresponding to each of the multiple to-be-merged models to obtain corresponding merged texture data; and performing data merging in a material attribute property according to a basic material attribute corresponding to each of the multiple to-be-merged models to obtain corresponding merged material attribute data.

According to one or more embodiments of the present disclosure, [example four] provides the batch rendering method. The step of performing the data merging in the model mesh property according to the model mesh data corresponding to each of the multiple to-be-merged models to obtain the corresponding merged mesh data includes: extracting the model mesh data from each of the multiple model data sets; merging data of the same type among model mesh data in the multiple model data sets in a sequence in which the multiple to-be-merged models are arranged in the model list to obtain initially merged mesh data; and performing a merging optimization on the initially merged mesh data to form the merged mesh data.

According to one or more embodiments of the present disclosure, [example five] provides the batch rendering method. The step of merging the data of the same type among the model mesh data in the multiple model data sets in the sequence in which the multiple to-be-merged models are arranged in the model list to obtain the initially merged mesh data includes: using the sequence in which the multiple to-be-merged models are arranged in the model list as a data merging sequence; for vertex attribute data and vertex index offsets included in the model mesh data in the multiple model data sets, merging the vertex attribute data and updating the vertex index offsets in the data merging sequence to obtain vertex-related merged data; for bone attribute data and bone index offsets included in the model mesh data in the multiple model data sets, merging the bone attribute data and updating the bone index offsets in the data merging sequence to obtain bone-related merged data; for fusion morphology data blocks included in the model mesh data in the multiple model data sets, merging the fusion morphology data blocks in the data merging sequence to obtain merged fusion morphology data; and using the vertex-related merged data, the bone-related merged data, and the merged fusion morphology data as the initially merged mesh data.

According to one or more embodiments of the present disclosure, [example six] provides the batch rendering method. The step of performing the merging optimization on the initially merged mesh data to form the merged mesh data includes: extracting the merged fusion morphology data included in the initially merged mesh data; searching the merged fusion morphology data for invalid data filled with a set numerical value and offset-free data expressed by the set numerical value; and removing the invalid data and the offset-free data to obtain merged fusion morphology data after removal, which constitute the merged mesh data after the merging optimization.

According to one or more embodiments of the present disclosure, [example seven] provides the batch rendering method. The step of performing the data merging in the texture property according to the texture corresponding to each of the multiple to-be-merged models to obtain the corresponding merged texture data includes: extracting the texture from each of the multiple model data sets and performing texture sorting in a descending order of texture dimensions of extracted textures to form a texture list; determining a target texture dimension according to a maximum texture dimension in the texture list and constructing a texture array having the target texture dimension; and merging the extracted textures in the texture array in a sequence of the texture list to obtain the corresponding merged texture data.

According to one or more embodiments of the present disclosure, [example eight] provides the batch rendering method. The step of determining the target texture dimension according to the maximum texture dimension in the texture list and constructing the texture array having the target texture dimension includes: converting the maximum texture dimension into a power of 2, determining a range of the power of 2 where the maximum texture dimension is within, and determining an upper limit of the range of the power of 2 to be the target texture dimension; and constructing the texture array including a set number of array levels and setting a texture dimension of each of the array levels to be the target texture dimension.

According to one or more embodiments of the present disclosure, [example nine] provides the batch rendering method. The step of merging the extracted textures in the texture array in the sequence of the texture list to obtain the corresponding merged texture data includes: using a starting array level in the texture array as a current texture filling layer and using a first texture in the texture list as a current texture; filling the current texture onto the current texture filling layer and recording texture filling information of the current texture in a set storage space; in the case where not all the textures are filled, selecting a new current texture in the sequence of the texture list; in the case where a remaining space of the current texture filling layer is greater than or equal to a texture dimension of the current texture, performing a texture filling operation; in the case where the remaining space of the current texture filling layer is less than the texture dimension of the current texture, extending a next array level as a new current texture filling layer and performing the texture filling operation; and in the case where all the textures are filled, using the texture array filled with all the textures as the merged texture data.

According to one or more embodiments of the present disclosure, [example ten] provides the batch rendering method. The step of performing the data merging in the material attribute property according to the basic material attribute corresponding to each of the multiple to-be-merged models to obtain the corresponding merged material attribute data includes: extracting the basic material attribute from each of the multiple model data sets and acquiring texture filling information corresponding to a texture associated with each of the multiple to-be-merged models from a set storage space; for each to-be-merged model of the multiple to-be-merged models, constructing material instance data of the each to-be-merged model based on the basic material attribute and the texture filling information of the texture associated; associating the material instance data with multiple vertices in the each to-be-merged model and forming a material instance index value of the multiple vertices, where the material instance index value is recorded in the merged mesh data in correspondence with the multiple vertices associated; and merging material instance data of the multiple to-be-merged models to constitute the merged material attribute data.

According to one or more embodiments of the present disclosure, [example eleven] provides the batch rendering method. The method may further include: acquiring model data of an independent rendering model based on an independent rendering instruction generated with respect to the independent rendering model to perform a rendering presentation of an image corresponding to the independent rendering model; where the independent rendering model is a to-be-searched model in the model list, which is not merged.

According to one or more embodiments of the present disclosure, [example twelve] provides the batch rendering method. The step in which an image processor performs the rendering presentation of the images corresponding to the searched to-be-merged models based on the batch rendering instruction includes: analyzing the generated batch rendering instruction and determining a rendering pipeline for rendering the searched to-be-merged models; and reading the merged data in each of the merging properties and acquiring the merged data in each of the merging properties through the rendering pipeline to perform the rendering presentation of the images corresponding to the searched to-be-merged models.

According to one or more embodiments of the present disclosure, [example thirteen] provides a batch rendering apparatus. The apparatus includes an acquisition module, a determination module, a merging module, and a rendering module. The acquisition module is configured to acquire a model list corresponding to a to-be-rendered character, where the model list includes at least one to-be-rendered three-dimensional model. The determination module is configured to search the at least one to-be-rendered three-dimensional model according to a preset batch rendering condition to determine to-be-merged models, where each of the to-be-merged models is a to-be-rendered three-dimensional model satisfying the preset batch rendering condition. The merging module is configured to perform model data merging in set different merging properties according to model data sets corresponding to the searched to-be-merged models to obtain merged data in each of the merging properties. The rendering module is configured to acquire the merged data in each of the merging properties based on a generated batch rendering instruction to perform a rendering presentation of images corresponding to the searched to-be-merged models.

According to one or more embodiments of the present disclosure, [example fourteen] provides an electronic device. The electronic device includes one or more processors, and a storage apparatus configured to store one or more programs; where the one or more programs, when executed by the one or more processors, cause the one or more processors to perform the batch rendering method as described in any one of examples one to twelve.

According to one or more embodiments of the present disclosure, [example fourteen] provides a storage medium including computer-executable instructions which, when executed by a computer processor, cause the computer processor to perform the batch rendering method as described in any one of examples one to twelve.

Additionally, although multiple operations are depicted in a particular order, this should not be construed as a requirement that these operations be performed in the particular order shown or in a sequential order. In certain circumstances, multitasking and parallel processing may be advantageous. Similarly, although multiple implementation details are included in the preceding discussion, these should not be construed as limiting the scope of the present disclosure. Some features described in the context of separate embodiments may also be implemented in combination in a single embodiment. Conversely, multiple features described in the context of a single embodiment may also be implemented in multiple embodiments individually or in any suitable subcombination.

What is claimed is:

1. A batch rendering method, comprising:
   acquiring a model list corresponding to a to-be-rendered character, wherein the model list comprises a plurality of to-be-rendered three-dimensional models;
   searching the plurality of to-be-rendered three-dimensional models for to-be-rendered three-dimensional models which are associated with identical configuration information of a rendering pipeline, and taking the to-be-rendered three-dimensional models which are associated with the identical configuration information of the rendering pipeline as a plurality of to-be-merged models;
   acquiring a plurality of model data sets which are in one-to-one correspondence with the plurality of to-be-merged models, wherein each of the plurality of model data sets comprises a texture belonging to a texture property;
   extracting the texture from each of the plurality of model data sets and performing texture sorting in a descending order of texture dimensions of extracted textures to form a texture list;
   determining a target texture dimension according to a maximum texture dimension in the texture list, and constructing a texture array comprising a plurality of array levels; wherein each of the plurality of array levels has a size identical to the target texture dimension;
   filling the plurality of array levels with the extracted textures in a sequence of the texture list to merge the extracted textures, so as to obtain merged texture data; and
   acquiring the merged texture data based on a generated batch rendering instruction, and performing a rendering presentation of images corresponding to the plurality of to-be-merged models through the rendering pipeline.

2. An electronic device, comprising:
   at least one processor; and
   a storage apparatus configured to store at least one program;
   wherein the at least one program, when executed by the at least one processor, causes the at least one processor to perform a batch rendering method,
   wherein the batch rendering method comprises:
   acquiring a model list corresponding to a to-be-rendered character, wherein the model list comprises a plurality of to-be-rendered three-dimensional models;
   searching the plurality of to-be-rendered three-dimensional models for to-be-rendered three-dimensional models which are associated with identical configuration information of a rendering pipeline, and taking the to-be-rendered three-dimensional models which are associated with the identical configuration information of the rendering pipeline as a plurality of to-be-merged models;
   acquiring a plurality of model data sets which are in one-to-one correspondence with the plurality of to-be-merged models, wherein each of the plurality of model data sets comprises a texture belonging to a texture property;
   extracting the texture from each of the plurality of model data sets and performing texture sorting in a descending order of texture dimensions of extracted textures to form a texture list;
   determining a target texture dimension according to a maximum texture dimension in the texture list, and constructing a texture array comprising a plurality of array levels; wherein each of the plurality of array levels has a size identical to the target texture dimension;
   filling the plurality of array levels with the extracted textures in a sequence of the texture list to merge the extracted textures, so as to obtain merged texture data; and
   acquiring the merged texture data based on a generated batch rendering instruction, and performing a rendering presentation of images corresponding to the plurality of to-be-merged models through the rendering pipeline.

3. A non-transitory storage medium including computer-executable instructions which, when executed by a computer processor, cause the computer processor to perform a batch rendering method,
   wherein the batch rendering method comprises:
   acquiring a model list corresponding to a to-be-rendered character, wherein the model list comprises a plurality of to-be-rendered three-dimensional models;
   searching the plurality of to-be-rendered three-dimensional models for to-be-rendered three-dimensional models which are associated with identical configuration information of a rendering pipeline, and taking the to-be-rendered three-dimensional models which are associated with the identical configuration information of the rendering pipeline as a plurality of to-be-merged models;
   acquiring a plurality of model data sets which are in one-to-one correspondence with the plurality of to-be-merged models, wherein each of the plurality of model data sets comprises a texture belonging to a texture property;
   extracting the texture from each of the plurality of model data sets and performing texture sorting in a descending order of texture dimensions of extracted textures to form a texture list;
   determining a target texture dimension according to a maximum texture dimension in the texture list, and constructing a texture array comprising a plurality of array levels; wherein each of the plurality of array levels has a size identical to the target texture dimension;
   filling the plurality of array levels with the extracted textures in a sequence of the texture list to merge the extracted textures, so as to obtain merged texture data; and
   acquiring the merged texture data based on a generated batch rendering instruction, and performing a rendering presentation of images corresponding to the plurality of to-be-merged models through the rendering pipeline.

* * * * *